(12) United States Patent
Park et al.

(10) Patent No.: US 8,948,264 B2
(45) Date of Patent: Feb. 3, 2015

(54) METHOD AND APPARATUS FOR MULTI-VIEW VIDEO ENCODING USING CHROMINANCE COMPENSATION AND METHOD AND APPARATUS FOR MULTI-VIEW VIDEO DECODING USING CHROMINANCE COMPENSATION

(75) Inventors: Gwang-Hoon Park, Seongnam-si (KR); Kyu-Heon Kim, Seoul (KR); Min-Woo Park, Suwon-si (KR); Jong-Tae Park, Bucheon-si (KR); Gwang-Hoon Park, legal representative, Seongnam-si (KR); Doug-Young Suh, Seongnam-si (KR)

(73) Assignees: Samsung Electronics Co., Ltd., Suwon-si (KR); Industry Academic Cooperation Foundation Kyunghee University, Seoul (KR)

( * ) Notice: Subject to any disclaimer, the term of this patent is extended or adjusted under 35 U.S.C. 154(b) by 811 days.

(21) Appl. No.: 12/812,566

(22) PCT Filed: Jan. 6, 2009

(86) PCT No.: PCT/KR2009/000035
§ 371 (c)(1),
(2), (4) Date: Dec. 9, 2010

(87) PCT Pub. No.: WO2009/088195
PCT Pub. Date: Jul. 16, 2009

(65) Prior Publication Data
US 2012/0014449 A1    Jan. 19, 2012

Related U.S. Application Data

(60) Provisional application No. 61/046,080, filed on Apr. 18, 2008.

(30) Foreign Application Priority Data

Jan. 10, 2008 (KR) .................... 10-2008-0002915
Sep. 4, 2008 (KR) .................... 10-2008-0087437

(51) Int. Cl.
*H04N 7/12* (2006.01)
*H04N 11/02* (2006.01)
(Continued)

(52) U.S. Cl.
CPC .......... *H04N 19/00315* (2013.01); *H04N 9/68* (2013.01); *H04N 19/00769* (2013.01);
(Continued)

(58) Field of Classification Search
None
See application file for complete search history.

(56) References Cited

U.S. PATENT DOCUMENTS

2004/0120396 A1    6/2004  Yun et al.
2006/0146143 A1    7/2006  Xin et al.
(Continued)

FOREIGN PATENT DOCUMENTS

KR    10-2008-0002952 A    1/2008

OTHER PUBLICATIONS

Communication dated Jul. 20, 2009, issued by the International Searching Authority in counterpart International Application No. PCT/KR2009/000036.

*Primary Examiner* — Dave Czekaj
*Assistant Examiner* — Nam Pham
(74) *Attorney, Agent, or Firm* — Sughrue Mion, PLLC

(57) ABSTRACT

Methods and apparatuses for efficiently coding and decoding multi-view video are provided. A method of decoding multi-view video includes: interpreting a first picture type indicating whether a current picture of the multi-view video is a reference video type for inter prediction; interpreting a block type indicating a method of determining a motion vector of a current block of the current picture; interpreting a chrominance compensation value of the current block based on at least one of the interpreted first picture type and the interpreted block type; and performing chrominance compensation on the current block by using the interpreted chrominance compensation value.

38 Claims, 25 Drawing Sheets

(51) Int. Cl.
*H04N 11/04* (2006.01)
*H04N 19/186* (2014.01)
*H04N 9/68* (2006.01)
*H04N 19/597* (2014.01)
*H04N 19/70* (2014.01)
*H04N 19/174* (2014.01)
*H04N 19/105* (2014.01)
*H04N 19/176* (2014.01)
*H04N 19/577* (2014.01)

(52) U.S. Cl.
CPC ... *H04N19/00884* (2013.01); *H04N 19/00272* (2013.01); *H04N 19/00024* (2013.01); *H04N 19/00278* (2013.01); *H04N 19/00721* (2013.01)

USPC ............ 375/240.16; 375/E7.027; 375/E7.125

(56) References Cited

U.S. PATENT DOCUMENTS

| | | |
|---|---|---|
| 2006/0232666 A1 | 10/2006 | Op De Beeck et al. |
| 2007/0064799 A1 | 3/2007 | Ha |
| 2007/0109409 A1 | 5/2007 | Yea et al. |
| 2008/0073487 A1* | 3/2008 | Brock et al. ............... 250/208.1 |
| 2010/0260265 A1* | 10/2010 | Jeon et al. ............... 375/240.25 |
| 2010/0266042 A1* | 10/2010 | Koo et al. ............... 375/240.16 |

\* cited by examiner

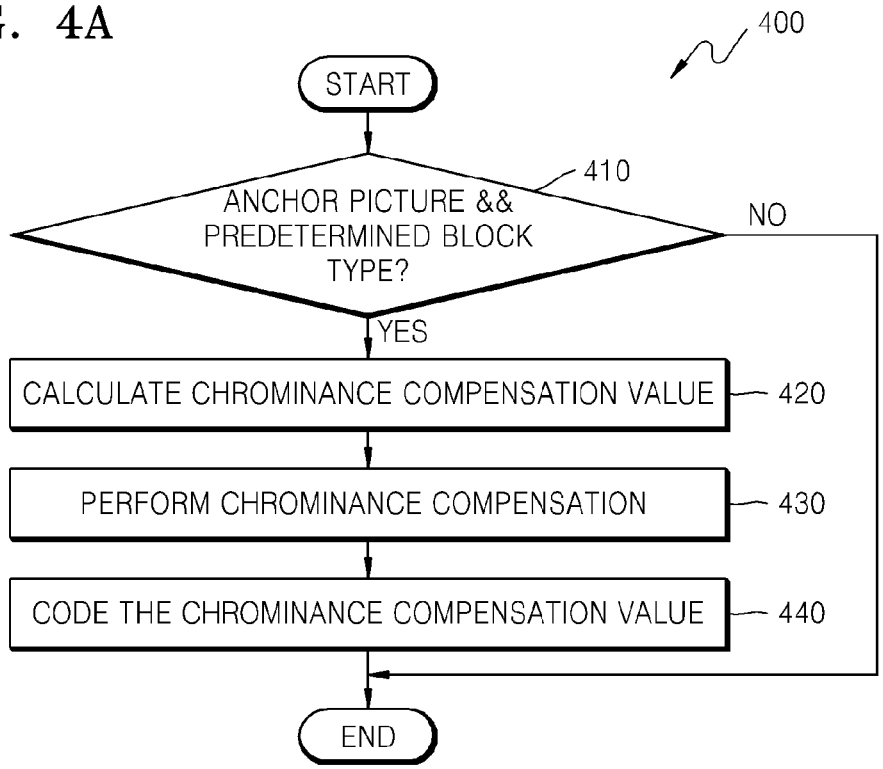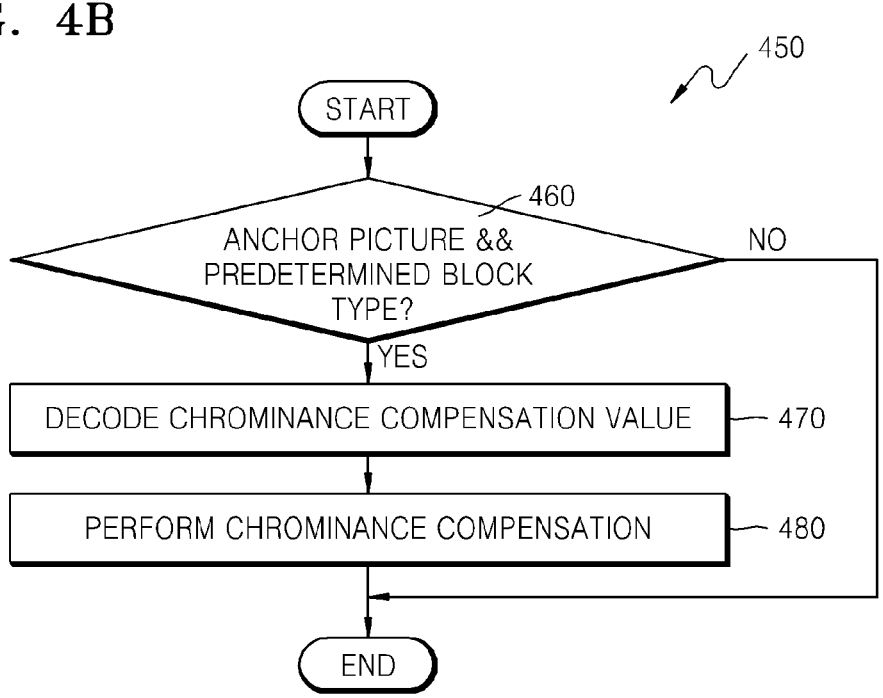

| slice_data( ) { | C | Descriptor |
|---|---|---|
| if( entropy_coding_mode_flag ) | | |
| while( !byte_aligned( ) ) | | |
| cabac_alignment_one_bit | 2 | f(1) |
| CurrMbAddr = first_mb_in_slice * ( 1 + MbaffFrameFlag ) | | |
| moreDataFlag = 1 | | |
| prevMbSkipped = 0 | | |
| do { | | |
| if( slice_type != I && slice_type != SI ) { | | |
| if( !entropy_coding_mode_flag ) { | | |
| 510 — mb_skip_run | 2 | ue(v) |
| prevMbSkipped = ( mb_skip_run > 0 ) | | |
| for( i=0; i<mb_skip_run; i++ ) { | | |
| if( anchor_pic_flag ) { | | |
| 520 — anchor_chroma_information() | 2 | |
| } | | |
| CurrMbAddr = NextMbAddress( CurrMbAddr ) | | |
| } | | |
| moreDataFlag = more_rbsp_data( ) | | |
| } else { | | |
| 530 — mb_skip_flag | 2 | ae(v) |
| if( mb_skip_flag && anchor_pic_flag ) { | | |
| 540 — anchor_chroma_information() | 2 | |
| } | | |
| moreDataFlag = !mb_skip_flag | | |
| } | | |

FIG. 5B

| | | 550 |
|---|---|---|
| if( moreDataFlag ) { | | |
| if( MbaffFrameFlag && ( CurrMbAddr % 2 == 0 \|\| <br>( CurrMbAddr % 2 == 1 && prevMbSkipped ) ) ) | | |
| mb_field_decoding_flag | 2 | u(1) \| ae(v) |
| macroblock_layer( ) | 2 \| 3 \| 4 | |
| } | | |
| if( !entropy_coding_mode_flag ) | | |
| ... | | |
| } | | |
| CurrMbAddr = NextMbAddress( CurrMbAddr ) | | |
| } while( moreDataFlag ) | | |
| } | | |

FIG. 6A

| mb_pred( mb_type ) { | C | Descriptor |
|---|---|---|
| if( MbPartPredMode( mb_type, 0 )  = =  Intra_4x4  \|\|<br>MbPartPredMode( mb_type, 0 )  = =  Intra_8x8  \|\|<br>MbPartPredMode( mb_type, 0 )  = =  Intra_16x16 ) { | | |
| .... | | |
| } else if( MbPartPredMode( mb_type, 0 )  != Direct ) { | | |
| if ( ic_enable && NumMbPart( mb_type ) == 1 ) { | | |
| mb_ic_flag | 2 | u(1) \| ae(v) |
| if ( mb_ic_flag ) | | |
| dpcm_of_dvic | 2 | se(v) \|<br>ae(v) |
| } | | |
| if( anchor_pic_flag && NumMbPart( mb_type ) == 1 ) { | | |
| 610 — anchor_chroma_information() | 2 | |
| } | | |
| for( mbPartIdx = 0; mbPartIdx < NumMbPart( mb_type );<br>mbPartIdx++) | | |
| if( ( num_ref_idx_l0_active_minus1 > 0  \|\|<br>mb_field_decoding_flag ) &&<br>MbPartPredMode( mb_type, mbPartIdx )  !=  Pred_L1 ) | | |
| ref_idx_l0[ mbPartIdx ] | 2 | te(v) \| ae(v) |
| for( mbPartIdx = 0; mbPartIdx < NumMbPart( mb_type );<br>mbPartIdx++) | | |
| if( ( num_ref_idx_l1_active_minus1 > 0  \|\|<br>mb_field_decoding_flag ) &&<br>MbPartPredMode( mb_type, mbPartIdx )  !=  Pred_L0 ) | | |
| ref_idx_l1[ mbPartIdx ] | 2 | te(v) \| ae(v) |
| for( mbPartIdx = 0; mbPartIdx < NumMbPart( mb_type );<br>mbPartIdx++) | | |
| if( MbPartPredMode ( mb_type, mbPartIdx )  != Pred_L1 ) | | |
| for( compIdx = 0; compIdx < 2; compIdx++ ) | | |
| mvd_l0[ mbPartIdx ][ 0 ][ compIdx ] | 2 | se(v) \|<br>ae(v) |
| for( mbPartIdx = 0; mbPartIdx < NumMbPart( mb_type );<br>mbPartIdx++) | | |
| if( MbPartPredMode( mb_type, mbPartIdx )  != Pred_L0 ) | | |
| for( compIdx = 0; compIdx < 2; compIdx++ ) | | |
| mvd_l1[ mbPartIdx ][ 0 ][ compIdx ] | 2 | se(v) \|<br>ae(v) |

| | | |
|---|---|---|
| } else { | | |
|   if ( ic_enable ){ | | |
|     mb_ic_flag | 2 | u(1) \| ae(v) |
|   if( mb_ic_flag ) | | |
|     dpcm_of_dvic | 2 | se(v) \| ae(v) |
|   } | | |
|   if (anchor_pic_flag) { | | |
| 630 — anchor_chroma_information() | 2 | |
|   } | | |
|  } | | |
| } | | |

| slice_data( ) { | C | Descriptor |
|---|---|---|
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) { | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) { | | |
|           if( anchor_pic_flag && slice_type= =P) { | | |
| 810 —             anchor_chroma_information() | 2 | |
|           } | | |
|           CurrMbAddr = NextMbAddress( CurrMbAddr ) | | |
|         } | | |
|         moreDataFlag = more_rbsp_data( ) | | |
|       } else { | | |
|         mb_skip_flag | 2 | ae(v) |
|         if( mb_skip_flag && anchor_pic_flag<br>          && slice_type= =P ) { | | |
| 820 —           anchor_chroma_information() | 2 | |
|         } | | |
|         moreDataFlag = !mb_skip_flag | | |
|       } | | |
|       if( moreDataFlag ) { | | |
|         ... | | |
|       } | | |
|       CurrMbAddr = NextMbAddress( CurrMbAddr ) | | |
|   } while( moreDataFlag ) | | |
| } | | |

| mb_pred( mb_type ) { | C | Descriptor |
|---|---|---|
| if( MbPartPredMode( mb_type, 0 ) == Intra_4x4 \|\| <br> MbPartPredMode( mb_type, 0 ) == Intra_8x8 \|\| <br> MbPartPredMode( mb_type, 0 ) == Intra_16x16 ) { | | |
| ... | | |
| } else if( MbPartPredMode( mb_type, 0 ) != Direct ) { | | |
| if ( ic_enable && NumMbPart( mb_type ) == 1 ) { | | |
| mb_ic_flag | 2 | u(1) \| ae(v) |
| if ( mb_ic_flag ) | | |
| dpcm_of_dvic | 2 | se(v) \| ae(v) |
| } | | |
| if( anchor_pic_flag && slice_type= =P && <br> NumMbPart( mb_type ) == 1) { | | |
| 910—anchor_chroma_information() | 2 | |
| } | | |
| for( mbPartIdx = 0; mbPartIdx < NumMbPart( mb_type ); mbPartIdx++) | | |
| if( ( num_ref_idx_l0_active_minus1 > 0 \|\| <br> mb_field_decoding_flag ) && <br> MbPartPredMode( mb_type, mbPartIdx ) != Pred_L1 ) | | |
| ref_idx_l0[ mbPartIdx ] | 2 | te(v) \| ae(v) |
| for( mbPartIdx = 0; mbPartIdx < NumMbPart( mb_type ); mbPartIdx++) | | |
| if( ( num_ref_idx_l1_active_minus1 > 0 \|\| <br> mb_field_decoding_flag ) && <br> MbPartPredMode( mb_type, mbPartIdx ) != Pred_L0 ) | | |
| ref_idx_l1[ mbPartIdx ] | 2 | te(v) \| ae(v) |
| for( mbPartIdx = 0; mbPartIdx < NumMbPart( mb_type ); mbPartIdx++) | | |
| if( MbPartPredMode ( mb_type, mbPartIdx ) != Pred_L1 ) | | |
| for( compIdx = 0; compIdx < 2; compIdx++ ) | | |
| mvd_l0[ mbPartIdx ][ 0 ][ compIdx ] | 2 | se(v) \| ae(v) |
| for( mbPartIdx = 0; mbPartIdx < NumMbPart( mb_type ); mbPartIdx++) | | |
| if( MbPartPredMode( mb_type, mbPartIdx ) != Pred_L0 ) | | |
| for( compIdx = 0; compIdx < 2; compIdx++ ) | | |
| mvd_l1[ mbPartIdx ][ 0 ][ compIdx ] | 2 | se(v) \| ae(v) |

| | | |
|---|---|---|
| } else { | | |
|   if ( ic_enable ){ | | |
|     mb_ic_flag | 2 | u(1) \| ae(v) |
|     if( mb_ic_flag ) | | |
|       dpcm_of_dvic | 2 | se(v) \| ae(v) |
|   } | | |
|   if (anchor_pic_flag && slice_type==P) { | | |
| 930 — anchor_chroma_information() | 2 | |
|   } | | |
|   } | | |
| } | | |

FIG. 12

| slice_data( ) { | C | Descriptor |
|---|---|---|
| if( entropy_coding_mode_flag ) | | |
| while( !byte_aligned( ) ) | | |
| cabac_alignment_one_bit | 2 | f(1) |
| CurrMbAddr = first_mb_in_slice * ( 1 + MbaffFrameFlag ) | | |
| moreDataFlag = 1 | | |
| prevMbSkipped = 0 | | |
| do { | | |
| if( slice_type != I && slice_type != SI ) { | | |
| if( !entropy_coding_mode_flag ) { | | |
| mb_skip_run | 2 | ue(v) |
| prevMbSkipped = ( mb_skip_run > 0 ) | | |
| for( i=0; i<mb_skip_run; i++ ) { | | |
| if( use_chroma_offset_flag ) { | | |
| 1210 — anchor_chroma_information() | 2 | |
| } | | |
| CurrMbAddr = NextMbAddress( CurrMbAddr ) | | |
| } | | |
| moreDataFlag = more_rbsp_data( ) | | |
| } else { | | |
| mb_skip_flag | 2 | ae(v) |
| if(use_chroma_offset_flag) { | | |
| 1220 — anchor_chroma_information() | 2 | |
| } | | |
| moreDataFlag = !mb_skip_flag | | |
| } | | |
| if( moreDataFlag ) { | | |
| ... | | |
| } | | |
| CurrMbAddr = NextMbAddress( CurrMbAddr ) | | |
| } while( moreDataFlag ) | | |
| } | | |

| mb_pred( mb_type ) { | C | Descriptor |
|---|---|---|
| if( MbPartPredMode( mb_type, 0 ) == Intra_4x4 || <br> MbPartPredMode( mb_type, 0 ) == Intra_8x8 || <br> MbPartPredMode( mb_type, 0 ) == Intra_16x16 ) { | | |
| if( MbPartPredMode( mb_type, 0 ) == Intra_4x4 ) | | |
| for( luma4x4BlkIdx=0; luma4x4BlkIdx<16; luma4x4BlkIdx++ ) { | | |
| prev_intra4x4_pred_mode_flag[ luma4x4BlkIdx ] | 2 | u(1) | ae(v) |
| if( !prev_intra4x4_pred_mode_flag[ luma4x4BlkIdx ] ) | | |
| rem_intra4x4_pred_mode[ luma4x4BlkIdx ] | 2 | u(3) | ae(v) |
| } | | |
| if( MbPartPredMode( mb_type, 0 ) == Intra_8x8 ) | | |
| for( luma8x8BlkIdx=0; luma8x8BlkIdx<4; luma8x8BlkIdx++ ) { | | |
| prev_intra8x8_pred_mode_flag[ luma8x8BlkIdx ] | 2 | u(1) | ae(v) |
| if( !prev_intra8x8_pred_mode_flag[ luma8x8BlkIdx ] ) | | |
| rem_intra8x8_pred_mode[ luma8x8BlkIdx ] | 2 | u(3) | ae(v) |
| } | | |
| if( chroma_format_idc != 0 ) | | |
| intra_chroma_pred_mode | 2 | ue(v) | ae(v) |
| } else if( MbPartPredMode( mb_type, 0 ) != Direct ) { | | |
| if ( ic_enable && NumMbPart( mb_type ) == 1 ) { | | |
| mb_ic_flag | 2 | u(1) | ae(v) |
| If ( mb_ic_flag ) | | |
| dpcm_of_dvic | 2 | se(v) | ae(v) |
| } | | |
| if(use_chroma_offset_flag && NumMbPart( mb_type ) == =1 ) { | | |
| 1310— anchor_chroma_information() | 2 | |
| } | | |

| | | |
|---|---|---|
| for( mbPartIdx = 0; mbPartIdx < NumMbPart( mb_type ); mbPartIdx++) | | |
|   if( ( num_ref_idx_l0_active_minus1 > 0  \|\|<br>    mb_field_decoding_flag ) &&<br>    MbPartPredMode( mb_type, mbPartIdx ) != Pred_L1 ) | | |
|     ref_idx_l0[ mbPartIdx ] | 2 | te(v) \| ae(v) |
| for( mbPartIdx = 0; mbPartIdx < NumMbPart( mb_type ); mbPartIdx++) | | |
|   if( ( num_ref_idx_l1_active_minus1 > 0  \|\|<br>    mb_field_decoding_flag ) &&<br>    MbPartPredMode( mb_type, mbPartIdx ) != Pred_L0 ) | | |
|     ref_idx_l1[ mbPartIdx ] | 2 | te(v) \| ae(v) |
| for( mbPartIdx = 0; mbPartIdx < NumMbPart( mb_type ); mbPartIdx++) | | |
|   if( MbPartPredMode ( mb_type, mbPartIdx ) != Pred_L1 ) | | |
|     for( compIdx = 0; compIdx < 2; compIdx++ ) | | |
|       mvd_l0[ mbPartIdx ][ 0 ][ compIdx ] | 2 | se(v) \| ae(v) |
| for( mbPartIdx = 0; mbPartIdx < NumMbPart( mb_type ); mbPartIdx++) | | |
|   if( MbPartPredMode( mb_type, mbPartIdx ) != Pred_L0 ) | | |
|     for( compIdx = 0; compIdx < 2; compIdx++ ) | | |
|       mvd_l1[ mbPartIdx ][ 0 ][ compIdx ] | 2 | se(v) \| ae(v) |
| } else { | | |
|   if ( ic_enable ){ | | |
|     mb_ic_flag | 2 | u(1) \| ae(v) |
|     if( mb_ic_flag ) | | |
|       dpcm_of_dvic | 2 | se(v) \| ae(v) |
|   } | | |
|   if (use_chroma_offset_flag) { | | |
| 1330 —anchor_chroma_information() | 2 | |
|   } | | |
| } | | |
| } | | |

| mb_pred( mb_type ) { | C | Descriptor |
|---|---|---|
|   if( MbPartPredMode( mb_type, 0 )  ==  Intra_4x4 \|\|<br>    MbPartPredMode( mb_type, 0 )  ==  Intra_8x8 \|\|<br>    MbPartPredMode( mb_type, 0 )  ==  Intra_16x16 ) { | | |
|   .... | | |
|   } else if( MbPartPredMode( mb_type, 0 )  !=  Direct ) { | | |
|     if ( ic_enable && NumMbPart( mb_type ) == 1 ) { | | |
|       mb_ic_flag | 2 | u(1) \| ae(v) |
|       if ( mb_ic_flag ) | | |
|         dpcm_of_dvic | 2 | se(v) \|<br>ae(v) |
|     } | | |
|   if( anchor_pic_flag &&<br>    NumMbPart( mb_type ) == 1) { | | |
| 1610—anchor_chroma_information() | 2 | |
|   } | | |
|   for( mbPartIdx = 0; mbPartIdx < NumMbPart( mb_type );<br>mbPartIdx++) | | |
|     if( ( num_ref_idx_l0_active_minus1 > 0  \|\|<br>      mb_field_decoding_flag ) &&<br>      MbPartPredMode( mb_type, mbPartIdx )  !=  Pred_L1 ) | | |
|       ref_idx_l0[ mbPartIdx ] | 2 | te(v) \| ae(v) |
|   for( mbPartIdx = 0; mbPartIdx < NumMbPart( mb_type );<br>mbPartIdx++) | | |
|     if( ( num_ref_idx_l1_active_minus1 > 0  \|\|<br>      mb_field_decoding_flag ) &&<br>      MbPartPredMode( mb_type, mbPartIdx )  !=  Pred_L0 ) | | |
|       ref_idx_l1[ mbPartIdx ] | 2 | te(v) \| ae(v) |
|   for( mbPartIdx = 0; mbPartIdx < NumMbPart( mb_type );<br>mbPartIdx++) | | |
|     if( MbPartPredMode ( mb_type, mbPartIdx )  !=  Pred_L1 ) | | |
|       for( compIdx = 0; compIdx < 2; compIdx++ ) | | |
|         mvd_l0[ mbPartIdx ][ 0 ][ compIdx ] | 2 | se(v) \|<br>ae(v) |
|   for( mbPartIdx = 0; mbPartIdx < NumMbPart( mb_type );<br>mbPartIdx++) | | |
|     if( MbPartPredMode( mb_type, mbPartIdx )  !=  Pred_L0 ) | | |
|       for( compIdx = 0; compIdx < 2; compIdx++ ) | | |
|         mvd_l1[ mbPartIdx ][ 0 ][ compIdx ] | 2 | se(v) \|<br>ae(v) |

FIG. 16B

| | | |
|---|---|---|
| } else { | | |
|   if ( ic_enable ){ | | |
|     mb_ic_flag | 2 | u(1) \| ae(v) |
|     if( mb_ic_flag ) | | |
|       dpcm_of_dvic | 2 | se(v) \| ae(v) |
|   } | | |
|   if (anchor_pic_flag && slice_type==P) { | | |
| 1630—anchor_chroma_information() | 2 | |
|   } | | |
| } | | |
| } | | |

$$\text{offset}_{cb} = \frac{1}{M \times N} \sum_{i}^{M} \sum_{j}^{N} \{f_{cb}(i, j) - r_{cb}(i, j)\} \quad \text{---} \quad 1700$$

$$\text{offset}_{cr} = \frac{1}{M \times N} \sum_{i}^{M} \sum_{j}^{N} \{f_{cr}(i, j) - r_{cr}(i, j)\} \quad \text{---} \quad 1710$$

FIG. 18

$$r'_{cb}(i, j) = r_{cb}(i, j) + \text{offset}_{cb} \quad \text{---} \quad 1810$$

$$r'_{cr}(i, j) = r_{cr}(i, j) + \text{offset}_{cr} \quad \text{---} \quad 1820$$

| anchor_chroma_information ( ) { | C | Descriptor |
|---|---|---|
| cb_offset —1910 | 2 | se(v) \| ae(v) |
| cr_offset —1920 | 2 | se(v) \| ae(v) |
| } | | |

1900

| anchor_chroma_information ( ) { | C | Descriptor |
|---|---|---|
| cb_offset_flag —2010 | 2 | u(1) \| ae(v) |
| cr_offset_flag —2020 | 2 | u(1) \| ae(v) |
| if( cb_offset_flag ) | | |
|    cb_offset —2030 | 2 | se(v) \| ae(v) |
| if( cr_offset_flag ) | | |
|    cr_offset —2040 | 2 | se(v) \| ae(v) |
| } | | |

2000

METHOD AND APPARATUS FOR MULTI-VIEW VIDEO ENCODING USING CHROMINANCE COMPENSATION AND METHOD AND APPARATUS FOR MULTI-VIEW VIDEO DECODING USING CHROMINANCE COMPENSATION

CROSS REFERENCE TO RELATED APPLICATION

This application is a National Stage application under 35 U.S.C. §371 of PCT/KR2009/000035 filed on Jan. 6, 2009, which claims priority from Korean Patent Application No. 10-2008-0002915, filed on Jan. 10, 2008 in the Korean Intellectual Property Office, and Korean Patent Application No. 10-2008-0087437, filed on Sep. 4, 2008 in the Korean Intellectual Property Office, and which claims the benefit of U.S. Provisional Patent Application No. 61/046,080, filed on Apr. 18, 2008, all the disclosures of which are incorporated herein in their entireties by reference.

BACKGROUND

1. Field

Apparatuses and methods consistent with exemplary embodiments relate to a method and apparatus for efficiently coding or decoding multi-view video.

2. Description of the Related Art

In a related art field of multi-view video coding, research has been conducted to improve coding performance based on Moving Picture Expert Group (MPEG)-4 part 10 Advanced Video Coding (AVC)/H.264 standards, which are the existing international video standards. In joint scalable video coding (JSVC), hierarchical bi-directional (B)-pictures coding, which supports temporal scalability, is performed along a time axis, and inter-view prediction is performed to improve coding performance.

SUMMARY

Aspects of exemplary embodiments provide a method and apparatus for efficiently coding or decoding multi-view video.

According to an aspect of an exemplary embodiment, there is provided a method of coding multi-view video, the method including: determining a first picture type indicating whether a current picture of the multi-view video is a reference video type for inter prediction; determining a block type indicating a method of determining a motion vector of a current block of the current picture; determining a chrominance compensation value of the current block based on at least one of the determined first picture type and the determined block type; and performing chrominance compensation on the current block by using the determined chrominance compensation value.

The method may further include coding the determined chrominance compensation value.

The determining of the chrominance compensation value may include determining whether to perform chrominance compensation on the current block based on the determined first picture type, and the first picture type may indicate whether the current picture is a reference picture for inter predicting other pictures from a same viewpoint as the current picture and for inter-view predicting other pictures from a different viewpoint as the current picture.

The determining of the chrominance compensation value may further include determining whether to perform chrominance compensation on the current block based on the determined first picture type and the determined block type, and the block type may indicate whether the current block is a skip mode block type.

The determining of the chrominance compensation value may further include determining a second picture type of the current picture, and determining whether to perform chrominance compensation based on the determined first picture type, the determined block type and the determined second picture type.

The second picture type may include at least one of an I picture type, a P picture type and a B picture type.

The determining of the chrominance compensation value may further include setting a flag indicating whether to perform the chrominance compensation on the current block, according to whether to perform the chrominance compensation.

The setting of the flag may further include determining absolute values of differences between an average of pixel values of the current picture and an average of pixel values of a reference block of the current picture with respect to Y, U, and V components, and setting the flag based on a combination of the absolute values.

The setting of the flag based on the combination of the absolute values may include setting the flag based on a sum of an absolute value of a difference between an average of pixel values of the current picture and an average of pixel values of a reference block, for each of the Y, U, and V components.

The setting of the flag based on the combination of the absolute values may include setting the flag by combining squares of the absolute values of the differences between the averages of the pixel values of the Y, U, and V color components and calculating square roots of the combining results.

The setting of the flag based on the combination of the absolute values may include setting the flag based on an average of squares of the absolute values of the differences between the averages of the pixel values of Y, U and V components.

The setting of the flag may include: determining an absolute value of the difference between an average of pixel values of the current picture and averages of pixel values of a reference block of the current picture, for each of the U and V color components; determining a threshold of each of the U and V color components; and setting the flag by respectively comparing the absolute values with the thresholds of the U and V components.

The setting of the flag may include setting the flag based on a quantization parameter of the current picture.

The setting of the flag may include setting the flag based on a user input.

The determining of the chrominance compensation value may include: deriving the chrominance compensation value of the current block from at least one of chrominance compensation values of neighboring blocks of the current block when the block type of the current block is a skip block type; and calculating the chrominance compensation value by performing the chrominance compensation on the current block when the block type of the current block indicates that the current block is predicted using another reference video.

The determining of the chrominance compensation value may include calculating an average of the differences between all pixel values of the current block and a reference block of the current block, for each of U and V chrominance components.

If the current block has two or more reference blocks, the determining of the chrominance compensation value may include calculating an average of differences between pixel values of the current block and each of the reference blocks, for each of the chrominance components.

If the current block has two or more reference blocks, the determining of the chrominance compensation value may include generating a representative reference block from the reference blocks, and calculating an average of differences between pixel values of the current block and the representative reference block, for each of the chrominance components.

The generating of the representative reference block may include generating the representative reference block by interpolating the reference blocks.

The performing of the chrominance compensation may include combining the chrominance compensation value of the current block with pixel values of reference blocks of the current block for each of the chrominance components.

The performing of the chrominance compensation may include combining the chrominance compensation value of the current block with pixel values of the reference blocks for each of the chrominance components.

The performing of the chrominance compensation may include combining the chrominance compensation value of the current block with pixel values of the representative reference block, for each of the chrominance components.

The coding of the chrominance compensation value may include coding a chrominance compensation difference value that is a difference between a predicted chrominance compensation value, which is predicted from a chrominance compensation value of a reference block of the current block, and the chrominance compensation value of the current block, for each of color components.

The coding of the chrominance compensation value may further include setting a flag indicating whether to use the chrominance compensation difference value with respect to the chrominance compensation values of the respective chrominance components, and coding flags of the respective chrominance compensation difference values.

The deriving of the chrominance compensation value may include: comparing an absolute value of differences between pixel values of a first block and a third block with an absolute value of differences between pixel values of a second block and the third block; and determining a chrominance compensation value of one of the first and second blocks as the predicted chrominance compensation value of the current block, based on the comparing result, where the first block is located at a left side of the current block, the second block is located above the current block, and the third block is located at an upper left side of the current block.

The deriving of the chrominance compensation value may include determining a median value of chrominance compensation values of a first block, a second block, and a third block as the predicted chrominance compensation value of the current block, where the first block is located at a left side of the current block, the second block is located above the current block, and the third block is located at an upper right side of the current block.

The deriving of the chrominance compensation value may include determining an average of chrominance compensation values of a first block and a second block as the predicted chrominance compensation value of the current block, where the first block is located at a left side of the current block and the second block is located above the current block.

If the chrominance compensation value is 0, the flag indicating whether to perform chrominance compensation may be set to 0.

The deriving of the chrominance compensation value may include: determining priority in an order of first through fourth blocks which are neighboring blocks of the current block, where the first block is located at a left side of the current block, the second block is located above the current block, the third block is located at an upper right side of the current block, and the fourth block is located at an upper left side of the current block; determining a chrominance compensation value of a block having a same reference index as the current block and having a chrominance compensation value, as a predicted chrominance compensation value of the current block, from among the first through fourth blocks; if any one of the first through fourth blocks does not have the same reference index as the current block, determining a median value of chrominance compensation values of the first through fourth blocks as a predicted chrominance compensation value of the current block; and if the first through third blocks do not have a chrominance compensation value, determining a predicted chrominance compensation value of the current block to be 0.

According to an aspect of another exemplary embodiment, there is provided a method of decoding multi-view video, the method including: interpreting a first picture type indicating whether a current picture of the multi-view video is a reference picture type for inter prediction; interpreting a block type indicating a method of determining a motion vector of a current block of the current picture; interpreting a chrominance compensation value of the current block based on at least one of the interpreted first picture type and the interpreted block type; and performing chrominance compensation on the current block by using the interpreted chrominance compensation value.

The method may further include reconstructing the current block after the performing the chrominance compensation, and the current picture.

The interpreting of the chrominance compensation value may include determining whether to perform chrominance compensation on the current block based on the interpreted first picture type, and the first picture type indicates whether the current picture is a reference video for inter predicting other pictures from a same viewpoint as the current picture and is for inter-view predicting other pictures from a different viewpoint as the current picture.

The interpreting of the chrominance compensation value may further include determining whether to perform the chrominance compensation on the current block based on the interpreted first picture type and the interpreted block type, and the block type indicates whether the current block is a skip mode block type.

The method may further include interpreting a second picture type of the current picture.

The interpreting of the chrominance compensation value may further include determining whether to perform the chrominance compensation on the current block based on the interpreted first picture type, the interpreted block type and the interpreted second picture type.

The second picture type may include at least one of an I picture type, a P picture type and a B picture type.

The method may further include interpreting a flag indicating whether to perform the chrominance compensation on the current block.

The interpreting of the chrominance compensation value may further include determining whether to perform the chrominance compensation on the current block based on the interpreted first picture type, the interpreted flag and the interpreted block type.

The interpreting of the chrominance compensation value may further include: if the block type of the current block is a skip block type, deriving a chrominance compensation value of the current block from at least one of chrominance compensation values of neighboring blocks of the current block; and if the block type of the current block is not the skip block type, determining the chrominance compensation value of the current block by performing chrominance compensation on the current block.

The interpreting of the chrominance compensation value may include: interpreting a chrominance compensation difference value related to the current block; calculating a predicted chrominance compensation value of the current block by using at least one of chrominance compensation values of neighboring blocks of the current block; and determining the chrominance compensation value of the current block by combining the predicted chrominance compensation value and the chrominance compensation difference value.

The interpreting of the chrominance compensation value may further include interpreting a flag indicating whether to use the chrominance compensation difference value with respect to the chrominance compensation value.

The performing of chrominance compensation may further include performing the chrominance compensation on the current block by using the chrominance compensation difference value of the current block, based on the flag indicating whether to use the chrominance compensation difference value.

The deriving of the chrominance compensation value may further include: comparing an absolute value of a difference between pixel values of a first block and a third block with an absolute value of a difference between pixel values of a second block and the third block, where the first block is located at a left side of the current block, the second block is located above the current block, and the third block is located at an upper left side of the current block; and determining a chrominance compensation value of one of the first block and the second block as a predicted chrominance compensation value of the current block, based on the comparing result.

The deriving of the chrominance compensation value may include determining a median value of chrominance compensation values of a first block, a second block and a third block as a predicted chrominance compensation value of the current block, where the first block is located at a left side of the current block, the second block is located above the current block, and the third block is located at an upper right side of the current block.

The deriving of the chrominance compensation value may include determining an average of chrominance compensation values of a first block and a second block as a predicted chrominance compensation value of the current block, where the first block is located at a left side of the current block and the second block is located above the current block.

The deriving of the chrominance compensation value may include: determining priority in an order of first through fourth blocks which are neighboring blocks of the current block, where the first block is located at a left side of the current block, the second block is located above the current block, the third block is located at an upper right side of the current block, and the fourth block is located at an upper left side of the current block; determining a chrominance compensation value of a block having a same reference index as the current block and having a chrominance compensation value, as a predicted chrominance compensation value of the current block, from among the first through fourth blocks; if any one of the first through fourth blocks does not have the same reference index as the current block, determining a median value of chrominance compensation values of the first through fourth blocks as a predicted chrominance compensation value of the current block; and if the first through third blocks do not have a chrominance compensation value, determining a predicted chrominance compensation value of the current block to be 0.

If the flag indicating whether to perform the chrominance compensation is 0, the chrominance compensation value may be determined to be 1.

The flag indicating whether to perform the chrominance compensation may be set based on a combination of absolute values of differences between averages of pixel values of the current picture and a reference video of the current picture, where each of the absolute values is an absolute value of a difference between an average of pixel values of the current picture and an average of pixel values of the reference video, for each of Y, U, and V components.

The combination of the absolute values may include a sum of the absolute values of the differences between the averages of the pixel values of the Y, U, and V components.

The combination of the absolute values may include values obtained by combining squares of the absolute values of the differences between the averages of the pixel values of the Y, U, and V color components and calculating square roots of the combining results.

The combination of the absolute values may include an average of squares of the absolute values of the differences between the averages of the pixel values of a Y, U and V components.

The flag indicating whether to perform the chrominance compensation may be set based on a result of respectively comparing an absolute value of differences between an average of pixel values of the current picture and an average of pixel values of a reference video of the current picture, for each of U and V color components, with a predetermined threshold of the each of U and V components.

The flag indicating whether to perform the chrominance compensation may be set based on a quantization parameter of the current picture.

The flag indicating whether to perform the chrominance compensation may be set based on a user input.

In the interpreting of the chrominance compensation value, the chrominance compensation value may include a value obtained by averaging differences between all pixel values of the current block and a reference block of the current block, for each of U and V components.

In the interpreting of the chrominance compensation value, if the current block has two or more reference blocks, the chrominance compensation value may include a value obtained by averaging differences between all pixel values of the current block and each of the two or more reference blocks, for each of U and V components.

In the interpreting of the chrominance compensation value, if the current block has two or more reference blocks, the chrominance compensation value may include a value obtained by averaging differences between all pixel values of the current block and a representative reference block, which is generated from the two or more reference blocks, for each of U and V components.

The representative reference block may be generated by interpolating the two or more reference blocks.

The performing of the chrominance compensation may include combining the chrominance compensation value of the current block with pixel values of a reference block of the current block, for each of U and V components.

If the current block has two or more reference blocks, the performing of the chrominance compensation may include combining the chrominance compensation value of the current block with pixel values of each of the two or more reference blocks, for each of U and V components.

If the current block has two or more reference blocks, the performing of the chrominance compensation may include combining the chrominance compensation value of the current block with pixel values of a representative reference block, which is generated from the two or more reference blocks, for each of U and V components.

According to an aspect of another exemplary embodiment, there is provided an apparatus for coding multi-view video, the apparatus including: a first picture type determination unit which determines a first picture type indicating whether a current picture of the multi-view video is a reference video type for inter prediction; a block type determination unit which determines a block type indicating a method of determining a motion vector of a current block present in the current picture; a chrominance compensation value determination unit which determines a chrominance compensation value of the current block based on at least one of the determined first picture type and the determined block type; and a chrominance compensation performing unit which performs chrominance compensation on the current block by using the determined chrominance compensation value.

The multi-view video coding apparatus may further include a chrominance compensation value coding unit which codes the chrominance compensation value.

The chrominance compensation value determination unit may include a chrominance compensation performing determination unit which determines whether to perform the chrominance compensation based on the determined first picture type, where the first picture type indicates whether the current picture is a reference video for inter predicting other pictures from a same viewpoint as the current picture and for inter-view predicting other pictures from a different viewpoint as the current picture.

The chrominance compensation performing determination unit may determine whether to perform chrominance compensation on the current block based on the determined first picture type and the determined block type, and the block type may indicate whether the current block is a skip mode block type.

The chrominance compensation value determination unit may further include a second picture type determination unit which determines a second picture type of the current picture.

The chrominance compensation value determination unit may determine whether to perform the chrominance compensation based on the determined first picture type, the determined block type and the determined second picture type.

The second picture type may include at least one of an I picture type, a P picture type and a B picture type.

The chrominance compensation value determination unit may further include a chrominance compensation performing determination flag setting unit which sets a flag indicating whether to perform the chrominance compensation on the current block, according to whether to perform the chrominance compensation.

The chrominance compensation performing determination flag setting unit may determine absolute values of differences between an average of pixel values of the current picture and an average of pixel values of a reference block of the current picture with respect to Y, U, and V components, and may set the flag based on a combination of the absolute values.

The combination of the absolute values may include a sum of absolute values of the differences between averages of pixel values of the Y, U, and V components.

The combination of the absolute values may include values obtained by combining squares of the absolute values of the differences between the averages of the pixel values of the Y, U, and V components and calculating square roots of the results of combining the squares of the absolute values.

The combination of the absolute values may include an average of squares of the absolute values of the differences between the averages of the pixel values of the Y, U, and V components.

The chrominance compensation performing determination flag setting unit may determine absolute values of the differences between an average of pixel values of the current picture and averages of pixel values of a reference block of the current picture with respect to U and V components, determine a threshold of each of the U and V components; and set the flag by respectively comparing the absolute values with the thresholds of the U and V components.

The chrominance compensation performing determination flag setting unit may set the flag based on a quantization parameter of the current picture.

The chrominance compensation performing determination flag setting unit may set the flag based on a user input.

The chrominance compensation value determination unit may include: a chrominance compensation value derivation unit which derives the chrominance compensation value of the current block from chrominance compensation values of neighboring blocks of the current block when the block type of the current block is a skip block type; and a chrominance compensation value calculation unit which calculates the chrominance compensation value by performing chrominance compensation on the current block when the block type of the current block indicates that the current block is predicted using another reference video.

The chrominance compensation value determination unit may calculate an average of the differences between all pixel values of the current block and reference blocks of the current block, for each of chrominance components.

If the current block has two or more reference blocks, the chrominance compensation value determination unit may calculate an average of the differences between pixel values of the current block and the two or more reference blocks, for each of the chrominance components.

If the current block has two or more reference blocks, the chrominance compensation value determination unit may further include a representative reference block generation unit which generates a representative reference block from the two or more reference blocks, and which calculates an average of the differences between pixel values of the current block and the representative reference block, for each of the chrominance components.

The representative reference block generation unit may generate the representative reference block by interpolating the two or more reference blocks.

The chrominance compensation performing unit may combine the chrominance compensation value of the current block with pixel values of reference blocks of the current block, for each of the chrominance components.

The chrominance compensation performing unit may combine the chrominance compensation value of the current block with pixel values of the reference blocks, for each of the chrominance components.

The chrominance compensation performing unit may combine the chrominance compensation value of the current block with a pixel value of the representative reference block, for each of the chrominance components.

The chrominance compensation value coding unit may include a chrominance compensation difference value coding unit which codes a chrominance compensation difference value that is a difference between a predicted chrominance compensation value, which is predicted from a chrominance compensation value of a reference block of the current block, and the chrominance compensation value of the current block, for each of the chrominance components.

The chrominance compensation value coding unit may further include a flag coding unit which sets a flag indicating whether to use the chrominance compensation difference value with respect to the chrominance compensation values of the respective color components and codes the flags of the respective chrominance compensation difference values.

The chrominance compensation value derivation unit may include a directionality derivation unit which compares an absolute value of differences between pixel values of a first block and a third block with an absolute value of differences between pixel values of a second block and the third block and determines a chrominance compensation value of one of the first and second blocks as the predicted chrominance compensation value of the current block, based on the comparing result, where the first block is located at a left side of the current block, the second block is located above the current block, and the third block is located at an upper left side of the current block.

The chrominance compensation value derivation unit may include a median derivation unit which determines a median value of chrominance compensation values of a first block, a second block and a third block as the predicted value of the chrominance compensation value of the current block, where the first block is located at a left side of the current block, the second block is located above the current block, and the third block is located at an upper right side of the current block.

The chrominance compensation value deriving unit may include an average derivation unit which determines an average of chrominance compensation values of a first block and a second block as the predicted value of the chrominance compensation value of the current block, where the first block is located at a left side of the current block and the second block is located above the current block.

If the chrominance compensation value is 0, the flag indicating whether to perform chrominance compensation may be set to 0.

The chrominance compensation value derivation unit may include a priority derivation unit which: determines priority in an order of first through fourth blocks which are neighboring blocks of the current block, where the first block is located at a left side of the current block, the second block is located above the current block, the third block is located at an upper right side of the current block, and the fourth block is located at an upper left side of the current block; determines a chrominance compensation value of a block having a same reference index as the current block and having a chrominance compensation value, as a predicted chrominance compensation value of the current block, from among the first through fourth blocks; if any one of the first through fourth blocks does not have the same reference index as the current block, determines a median value of chrominance compensation values of the first through fourth blocks as a predicted chrominance compensation value of the current block; and if the first through third blocks do not have a chrominance compensation value, determines a predicted chrominance compensation value of the current block to be 0.

According to an aspect of another exemplary embodiment, there is provided apparatus for decoding multi-view video, the apparatus including: a first picture type interpretation unit which interprets a first picture type indicating whether a current picture is a reference picture type for inter prediction; a block type interpretation unit which interprets a block type indicating a method of determining a motion vector of a current block of the current picture; a chrominance compensation value interpretation unit which interprets a chrominance compensation value of the current block based on at least one of the interpreted first picture type and the interpreted block type; and a chrominance compensation performing unit which performs chrominance compensation on the current block by using the interpreted chrominance compensation value.

The multi-view video decoding apparatus may further include a reconstruction unit which reconstructs the current block that has undergone the chrominance compensation, and the current picture.

The chrominance compensation value interpretation unit may include a chrominance compensation performing determination unit which determines whether to perform the chrominance compensation on the current block based on the interpreted first picture type.

The first picture type may indicate whether the current picture is a reference picture for inter predicting other pictures from a same viewpoint as the current picture and for inter-view predicting other pictures from a different viewpoint as the current picture.

The chrominance compensation performing determination unit may determine whether to perform the chrominance compensation on the current block based on the interpreted first picture type and the interpreted block type.

The block type may indicate whether the current block is a skip mode block type.

The chrominance compensation value interpretation unit may further include a second picture type interpretation unit which interprets a second picture type of the current picture, and may determine whether to perform the chrominance compensation on the current block based on the interpreted first picture type, the interpreted block type, and the interpreted second picture type.

The second picture type may include at least one of an I picture type, a P picture type and a B picture type.

The chrominance compensation value interpretation unit may further include a chrominance compensation performing determination flag interpretation unit which interprets a flag indicating whether to perform the chrominance compensation on the current block, and may determine whether to perform the chrominance compensation on the current block based on the first picture type, the flag and the block type.

The chrominance compensation value interpretation unit may further include a chrominance compensation value determination unit which derives a chrominance compensation value of the current block from at least one of chrominance compensation values of neighboring blocks of the current block when the block type of the current block is a skip block type, and chrominance compensation value interpretation unit may determine the chrominance compensation value of the current block by performing chrominance compensation on the current block when the block type of the current block is not the skip block type.

The chrominance compensation value interpretation unit may include a chrominance compensation difference value interpretation unit which: interprets a chrominance compensation difference value related to the current block; calculates a predicted chrominance compensation value of the current block by using at least one of chrominance compensation values of neighboring blocks of the current block; and determines the chrominance compensation value of the current block by combining the predicted chrominance compensation value and the chrominance compensation difference value.

The chrominance compensation value interpretation unit may further include a chrominance compensation value usage determination flag interpretation unit which interprets a flag indicating whether to use the chrominance compensation difference value with respect to the chrominance compensation value.

The chrominance compensation value usage determination flag interpretation unit may perform the chrominance compensation on the current block by using the chrominance compensation difference value of the current block, based on the flag indicating whether to use the chrominance compensation difference value.

The chrominance compensation value derivation unit may further include a directionality derivation unit which compares an absolute value of a difference between pixel values of a first block and a third block with an absolute value of a difference between pixel values of a second block and the third block, where the first block is located at a left side of the current block, the second block is located above the current block, and the third block is located at an upper left side of the current block; and which determines a chrominance compensation value of one of the first block and the second block as a predicted chrominance compensation value of the current block, based on the comparing result.

The chrominance compensation value derivation unit may further include a median derivation unit which determines a median value of chrominance compensation values of a first block, a second block and a third block as a predicted chrominance compensation value of the current block, where the first block is located at a left side of the current block, the second block is located above the current block, and the third block is located at an upper right side of the current block.

The chrominance compensation value derivation unit may further include an average derivation unit which determines an average of chrominance compensation values of a first block and a second block as a predicted chrominance compensation value of the current block, where the first block is located at a left side of the current block and the second block is located above the current block.

The chrominance compensation value derivation unit may include a priority derivation unit which determines priority in an order of first through fourth blocks which are neighboring blocks of the current block, where the first block is located at a left side of the current block, the second block is located above the current block, the third block is located at an upper right side of the current block, and the fourth block is located at an upper left side of the current block; which determines a chrominance compensation value of a block having a same reference index as the current block and having a chrominance compensation value, as a predicted chrominance compensation value of the current block, from among the first through fourth blocks; which determines a median value of chrominance compensation values of the first through fourth blocks as a predicted chrominance compensation value of the current block when any one of the first through fourth blocks does not have the same reference index as the current block; and which determines a predicted chrominance compensation value of the current block to be 0 when the first through third blocks do not have a chrominance compensation value.

If the flag indicating whether to perform chrominance compensation is 0, the chrominance compensation value may be determined to be 0.

The flag indicating whether to perform chrominance compensation may be set based on a combination of absolute values of differences between averages of pixel values of the current picture and a reference video of the current picture.

Each of the absolute values may be an absolute value of a difference between an average of pixel values of the current picture and an average of pixel values of the reference video, for each of Y, U, and V components.

The combination of the absolute values may include a sum of the absolute values of the differences between the averages of the pixel values of the Y, U, and V components.

The combination of the absolute values may include values obtained by combining squares of the absolute values of the differences between the averages of the pixel values of the Y, U, and V color components and then calculating square roots of the combining results.

The combination of the absolute values may include an average of squares of the absolute values of the differences between the averages of the pixel values of a Y, U and V components.

The flag indicating whether to perform chrominance compensation may be set based on a result of respectively comparing an absolute value of differences between an average of pixel values of the current picture and an average of pixel values of a reference video of the current picture, for each of U and V color components, with a predetermined threshold of the each of the U and V components.

The flag indicating whether to perform the chrominance compensation may be set based on a quantization parameter of the current picture.

The flag indicating whether to perform the chrominance compensation may be set based on a user input.

In the interpreting of the chrominance compensation value, the chrominance compensation value may include a value obtained by averaging differences between all pixel values of the current block and a reference block of the current block, for each of U and V components.

In the interpreting of the chrominance compensation value, if the current block has two or more reference blocks, the chrominance compensation value may include a value obtained by averaging differences between all pixel values of the current block and each of the two or more reference blocks, for each of U and V components.

In the interpreting of the chrominance compensation value, if the current block has two or more reference blocks, the chrominance compensation value may include a value obtained by averaging differences between all pixel values of the current block and a representative reference block, which is generated from the two or more reference blocks, for each of U and V components.

The representative reference block may be generated by interpolating the two or more reference blocks.

The performing of the chrominance compensation may include combining the chrominance compensation value of the current block with pixel values of a reference block of the current block, for each of U and V components.

If the current block has two or more reference blocks, the performing of the chrominance compensation may include combining the chrominance compensation value of the current block with pixel values of each of the two or more reference blocks, for each of U and V components.

If the current block has two or more reference blocks, the performing of the chrominance compensation may include combining the chrominance compensation value of the current block with pixel values of a representative reference block, which is generated from the two or more reference blocks, for each of U and V components.

According to an aspect of another exemplary embodiment, there is provided a computer program for executing a method of coding multi-view video, the method including: determining a first picture type indicating whether a current picture of the multi-view video is a reference video type for inter prediction; determining a block type indicating a method of determining a motion vector of a current block of the current picture; determining a chrominance compensation value of the current block based on at least one of the determined first picture type and the determined block type; and performing chrominance compensation on the current block by using the determined chrominance compensation value.

According to an aspect of another exemplary embodiment, there is provided a computer program for executing a method of decoding multi-view video, the method including: interpreting a first picture type indicating whether a current picture of the multi-view video is a reference picture type for inter prediction; interpreting a block type indicating a method of determining a motion vector of a current block of the current picture; interpreting a chrominance compensation value of the current block based on at least one of the interpreted first picture type and the interpreted block type; and performing chrominance compensation on the current block by using the interpreted chrominance compensation value.

According to an aspect of another exemplary embodiment, there is provided a method of decoding multi-view video, the method including: interpreting a first picture type indicating whether a current picture of the multi-view video is a reference picture type for inter prediction; interpreting a chrominance compensation value of the current block based on the interpreted first picture type; and performing chrominance compensation on the current block by using the interpreted chrominance compensation value.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 4A is a flowchart illustrating a method of coding a chrominance compensation value in consideration of a first picture type and a block type according to an exemplary embodiment;

FIG. 4B is a flowchart illustrating a method of decoding a chrominance compensation value in consideration of a first picture type and a block type according to an exemplary embodiment;

FIGS. 5A and 5B illustrate syntaxes for coding/decoding multi-view video by performing chrominance compensation in consideration of a first picture type and a block type, according to an exemplary embodiment;

FIGS. 6A and 6B illustrate syntaxes for coding or decoding multi-view video by performing chrominance compensation in consideration of a first picture type and a block type, according to another exemplary embodiment;

FIG. 7A is a flowchart illustrating a method of coding a chrominance compensation value in consideration of a first picture type, a second picture type and a block type, according to an exemplary embodiment;

FIG. 8 illustrates syntax for coding or decoding multi-view video by performing chrominance compensation in consideration of a first picture type, a second picture type and a block type, according to an exemplary embodiment;

FIGS. 9A and 9B illustrate syntaxes for coding or decoding multi-view video by performing chrominance compensation in consideration of a first picture type, a second picture type and a block type, according to another exemplary embodiment;

FIG. 10A is a flowchart illustrating a method of coding a chrominance compensation value based on information indicating whether to perform chrominance compensation and on a block type, according to an exemplary embodiment;

FIG. 12 illustrates syntax for coding or decoding multi-view video by performing chrominance compensation in consideration of information indicating whether to perform chrominance compensation and of a block type, according to an exemplary embodiment;

FIGS. 13A and 13B illustrates syntax for coding or decoding multi-view video by performing chrominance compensation in consideration of information indicating whether to perform chrominance compensation and of a block type, according to another exemplary embodiment;

FIGS. 16A and 16B illustrate syntaxes for coding or decoding multi-view video by performing chrominance compensation in consideration of information indicating whether to perform chrominance compensation and of a block type, according to an exemplary embodiment;

FIG. 17 illustrates equations for determining a chrominance compensation value according to an exemplary embodiment;

FIG. 18 illustrates equations for performing chrominance compensation according to an exemplary embodiment;

DETAILED DESCRIPTION OF EXEMPLARY EMBODIMENTS

Figure 1:
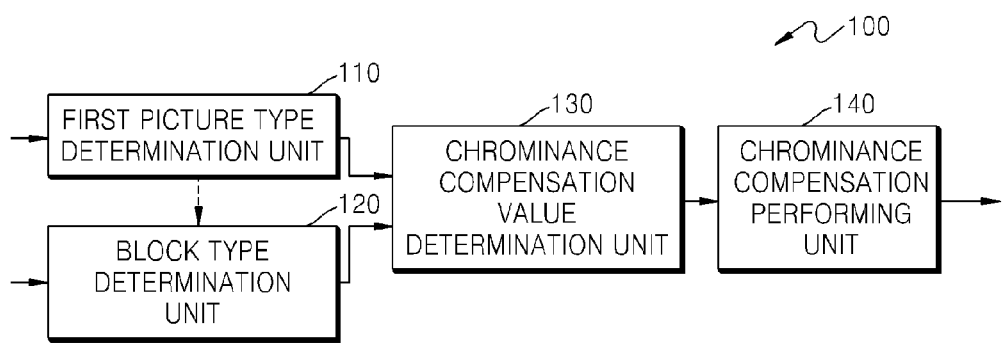
FIG. 1 is a block diagram of a multi-view video coding apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

FIG. 1 is a block diagram of a multi-view video coding apparatus 100 according to an exemplary embodiment. Referring to FIG. 1, the multi-view video coding apparatus 100 includes a first picture type determination unit 110, a block type determination unit 120, a chrominance compensation value determination unit 130, and a chrominance compensation performing unit 140.

The first picture type determination unit 110 determines a first picture type indicating whether a current picture of a multi-view video is a reference picture for inter prediction from among pictures of the multi-view video which are to be coded, and outputs information regarding the determined first picture type to the chrominance compensation value determination unit 130. If the first picture type and block type information are considered to determine additional information, an output of the first picture type determination unit 110 may be input to the block type determination unit 120.

For example, in an exemplary embodiment applied to multi-view video coding (MVC), the first picture type may be categorized into an anchor picture type and a non-anchor picture type. The anchor picture type on which inter-view prediction is performed is a reference picture used for inter-view predicting other pictures from a different viewpoint as the current picture and for inter predicting other pictures from a same viewpoint as the current picture. According to an exemplary embodiment, a chrominance compensation value of a current block may be calculated depending on whether the current picture is an anchor picture.

The block type determination unit 120 may determine whether the current block is a skip mode block type and sets the block type of the current block accordingly. If the block type and the first picture type are considered to determine whether to perform chrominance compensation, the block type determination unit 120 may operate depending on a determining result of the first picture type determination unit 110.

For example, in an exemplary embodiment applied to MVC, the block type may include at least one of a skip mode block, a direct mode block, and an inter mode block. The skip mode block has no unique vector of the current block. That is, a motion vector of the skip mode block is zero or is determined based on a motion vector of a neighboring block of the current block. A residual image and block data of the skip mode block are not coded.

According to an exemplary embodiment, chrominance compensation may be performed when the current block is in a predetermined block mode. Examples of the predetermined block mode include at least one of a skip mode block, a 16×16 inter block mode, a direct block mode, a block mode in which prediction is performed based on at least one of other reference pictures (i.e., all types of inter block modes that include a skip mode and a direct mode, etc. Also, the predetermined block mode may be any subset of block modes, i.e., all inter block modes including the skip mode and the direct mode, in which prediction is performed, may be based on at least one of other reference pictures that can be used in the field of MVC.

The chrominance compensation value determination unit 130 determines the chrominance compensation value of the current block, based on at least one of the first picture type of the current picture which is determined by the first picture type determination unit 110 and on the block type of the current block which is determined by the block type determination unit 120. Accordingly, the chrominance compensation value determination unit 130 outputs the chrominance compensation value to the chrominance compensation performing unit 140.

Although not shown in FIG. 1, the chrominance compensation value determination unit 130 may include a chrominance compensation performing determination unit that determines whether to perform the chrominance compensation based on at least one of the first picture type and the block type. The chrominance compensation performing determination unit may determine that the chrominance compensation is to be performed on the current block when the first picture type is an anchor picture, though it is understood that other exemplary embodiments are not limited thereto. For example, according to another exemplary embodiment, the chrominance compensation performing determination unit may determine that chrominance compensation is to be performed on the current block when the first picture type is an anchor picture and the current block is in the predetermined block mode, such as the skip mode.

In one or more exemplary embodiments, the multi-view video coding apparatus 100 may further include a second picture type determination unit (not shown) which determines a second picture type of the current picture. An example of the second picture type may include at least one of an intra-coded (I) picture type, a predictive-coded (P) picture type, and a bi-directional (B) picture type. As an example, the chrominance compensation value determination unit 130 may determine that chrominance compensation is to be performed on the current block when the current picture is an anchor picture, the current block is in the predetermined block mode, and the second picture type of the current picture is the P picture type.

Moreover, in one or more exemplary embodiments, the multi-view video coding apparatus 100 may also include a chrominance compensation performing determination flag setting unit (not shown) which sets information indicating whether to perform the chrominance compensation on the current block. For example, if an absolute value of a difference between an average of pixel values of the current picture and an average of pixel values of a reference video of the current picture is determined for each of color components, a flag indicating whether to perform chrominance compensation may be set based on a combination of absolute values of the respective color components. Examples of the color components include Y, U, and V components, though it is understood that another exemplary embodiment is not limited thereto. A method of combining the absolute values of the respective color components according to one or more exemplary embodiments will be described later with reference to FIGS. 10A through 13B.

Alternatively or additionally, a flag indicating whether to perform chrominance compensation may be set based on a quantization parameter (QP) of the current picture. Also, a flag indicating whether to perform chrominance compensation may be set based on a user input.

Although not shown in FIG. 1, the chrominance compensation value determination unit 130 may include a chrominance compensation value derivation unit and a chrominance compensation value calculation unit. In this exemplary case, the chrominance compensation value determination unit 130 determines the chrominance compensation value by using the chrominance compensation value derivation unit or the chrominance compensation value calculation unit, based at least on the block type of the current block.

For example, if the current block is a skip mode block, the chrominance compensation value derivation unit may derive the chrominance compensation value of the current block from a chrominance compensation value of a neighboring block of the current block. If the current block is not a skip mode block, the chrominance compensation value calculation unit may calculate the chrominance compensation value of the current block through chrominance compensation. A method of deriving the chrominance compensation value of the current block according to one or more exemplary embodiments will be described later with reference to FIGS. 21 and 22, and a method of calculating the chrominance compensation value through chrominance compensation according to one or more exemplary embodiments will be described later with reference to FIG. 17.

The chrominance compensation performing unit 140 performs chrominance compensation on the current block by using the chrominance compensation value determined by the chrominance compensation value determination unit 130. Chrominance compensation may be performed by adding the chrominance compensation value of the current block to pixel values of a reference block. Chrominance compensation according to one or more exemplary embodiments will be described later in detail with reference to FIG. 18.

Furthermore, in one or more exemplary embodiments, the multi-view video coding apparatus 100 may further include a chrominance compensation value coding unit which codes the chrominance compensation value received from the chrominance compensation performing unit 140 and inserts the coding result into a bitstream. A coding method of the chrominance compensation value coding unit according to one or more exemplary embodiments will be described later in detail with reference to FIGS. 19 and 20.

Figure 2:
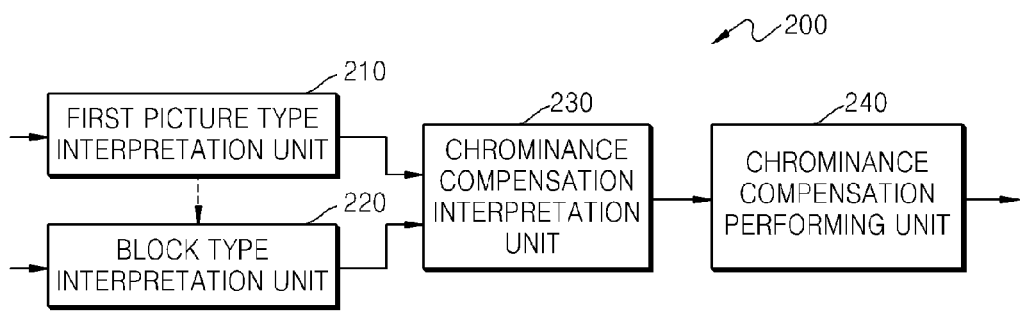
FIG. 2 is a block diagram of a multi-view video decoding apparatus according to an exemplary embodiment.

FIG. 2 is a block diagram of a multi-view video decoding apparatus 200 according to an exemplary embodiment. Referring to FIG. 2, the multi-view video decoding apparatus 200 includes a first picture type interpretation unit 210, a block type interpretation unit 220, a chrominance compensation value interpretation unit 230, and a chrominance compensation performing unit 240. The multi-view video decoding apparatus 200 may parse a received bitstream, extract information used for video reconstruction (such as at least one of picture video data, picture information, block information, additional information, information related to coding, etc.) from the bitstream, and transmit the extracted information to the first picture type interpretation unit 210, the block type interpretation unit 220, the chrominance compensation value interpretation unit 230, and the chrominance compensation performing unit 240. Hereinafter, first and second picture types and a block type are as defined above.

The first picture type interpretation unit 210 interprets the first picture type indicating whether a current picture of a multi-view video is a reference picture for inter prediction from among pictures of the multi-view video which are to be decoded, and outputs information regarding the interpreted first picture type to the chrominance compensation value interpretation unit 230.

In one or more exemplary embodiments, the multi-view video decoding apparatus 200 may further consider a block type in order to interpret the chrominance compensation value of the current block. In this exemplary case, an output of the first picture type interpretation unit 210 may be input to the block type interpretation unit 220. For example, in an exemplary embodiment applied to MVC, the first picture type may include an anchor picture type and a non-anchor picture type and the first picture type interpretation unit 210 may interpret whether the current picture is an anchor picture.

The block type interpretation unit 220 interprets, from the bitstream, a block type indicating a method of determining a motion vector of the current block included in the current picture, and outputs information regarding the interpreted block type to the chrominance compensation value interpretation unit 230. If the first picture type and the block type is considered in order to interpret additional information, the block type interpretation unit 220 may operate depending on an interpreting result of the first picture interpretation unit 210.

For example, in an exemplary embodiment applied to MVC, the block type may include at least one of a skip mode block, a direct mode block, and an inter mode block. In this exemplary case, the block type interpretation unit 220 may determine whether the current block is the skip mode block.

The chrominance compensation value interpretation unit 230 interprets, from the bitstream, the chrominance compensation value of the current block, based on at least one of the information regarding the first picture type received from the first picture type interpretation unit 210 and the information regarding the block type received from the block type interpretation unit 220. Furthermore, the chrominance compensation value interpretation unit 230 outputs the interpretation result to the chrominance compensation performing unit 240.

The chrominance compensation value interpretation unit 230 may include a chrominance compensation performing determination unit (not shown) which determines whether to perform chrominance compensation on the current block based on the first picture type. For example, the chrominance compensation performing determination unit may determine that chrominance compensation is to be performed on the current block when the current picture is the anchor picture.

Alternatively or additionally, the chrominance compensation performing determination unit may determine whether to perform the chrominance compensation on the current block, based on the first picture type of the current picture and the block type of the current block. For example, the chrominance compensation performing determination unit may determine that chrominance compensation is to be performed on the current block when the current picture is the anchor picture and the current block is in a predetermined block mode, such as a skip mode.

Although not shown in FIG. 2, the multi-view video decoding apparatus 200 may further include a second picture type interpretation unit which interprets a second picture type of the current picture. In this exemplary case, the chrominance compensation performing determination unit (not shown) of the chrominance compensation value interpretation unit 230 may determine whether to perform the chrominance compensation on the current block based on the first and second picture types and the block type. For example, the chrominance compensation performing determination unit may determine that chrominance compensation is to be performed on the current block when the current picture is an anchor picture and a P picture and the current block is a predetermined block type, such as a skip mode.

Although not shown in FIG. 2, the multi-view video decoding apparatus 200 may further include a chrominance compensation performing determination flag interpretation unit which interprets a flag indicating whether to perform the chrominance compensation on the current picture. In this exemplary case, the chrominance compensation performing determination unit (not shown) of the chrominance value interpretation unit 230 may determine whether to perform the chrominance compensation on the current block based on the first picture type, the flag indicating whether to perform chrominance compensation and the block type. One or more characteristics of the flag indicating whether to perform the chrominance compensation have been described above with respect to the multi-view video coding apparatus 100 illustrated in FIG. 1.

In an exemplary embodiment of the chrominance compensation value interpretation unit 230, a method of determining the chrominance compensation value may depend at least on the block type. For example, the chrominance compensation value interpretation unit 230 may further include a chrominance compensation value derivation unit (not shown) and a chrominance compensation value calculation unit (not shown). In this exemplary case, if the current block is a skip mode block, the chrominance compensation value derivation unit may derive the chrominance compensation value of the current block from a chrominance compensation value of a neighboring block of the current bloc. If the current block is not the skip mode block, the chrominance compensation value calculation unit may directly determine the chrominance compensation value of the current block by performing the chrominance compensation on the current block.

A method of deriving the chrominance compensation value of the current block by using a neighboring block according to one or more exemplary embodiments will be described later in detail with reference to FIGS. 21 and 22 and a method of directly determining the chrominance compensation value according to one or more exemplary embodiments will be described later in detail with reference to FIG. 17.

Furthermore, the chrominance compensation value interpretation unit 230 may directly interpret the chrominance compensation value of the current block and may interpret a chrominance compensation difference value regarding a chrominance compensation prediction value by using a neighboring block. A method of determining the chrominance compensation value by using the chrominance compensation difference value according to one or more exemplary embodiments will be described later in detail with reference to FIG. 19.

Moreover, the chrominance compensation value interpretation unit 230 may further include a chrominance compensation difference value usage determination flag interpretation unit (not shown) which interprets a flag indicating whether to use the chrominance compensation difference value with respect to the chrominance compensation value. A method of determining the chrominance compensation value by using the flag indicating whether to use the chrominance compensation difference value according to one or more exemplary embodiments, will be described later in detail with reference to FIG. 20.

The chrominance compensation performing unit 240 performs chrominance compensation on the current block by using the chrominance compensation value received from the chrominance compensation value interpretation unit 230. The chrominance compensation performing unit 240 may perform the chrominance compensation by determining a sum of pixel values of a reference block and the chrominance compensation value of the current block as a pixel value of the current block. A chrominance compensation method according to one or more exemplary embodiments will be described later in detail with reference to FIG. 18.

If the chrominance compensation difference value usage determination flag interpretation unit interprets the flag indicating whether to use the chrominance compensation difference value, the chrominance compensation performing unit 240 may perform chrominance compensation by using the chrominance compensation difference value according to the flag indicating whether to use the chrominance compensation difference value.

Furthermore, if the chrominance compensation performing unit 240 cannot use the chrominance compensation value for the current block, a chrominance compensation value that is derived from a neighboring block may be used. A method of deriving the chrominance compensation value according to one or more exemplary embodiments will be described later in detail with reference to FIGS. 21 and 22.

Although not shown in FIG. 2, the multi-view video decoding apparatus 200 may further include a reconstruction unit which reconstructs the current picture by using the current block that has undergone chrominance compensation, which was received from the chrominance compensation performing unit 240. Accordingly, the multi-view video decoding apparatus 200 is capable of reconstructing the multi-view video by using the received bitstream.

In the multi-view video coding apparatus 100 and the multi-view video decoding apparatus 200 according to exemplary embodiments, if the current picture is an anchor picture captured from a predetermined viewpoint, a reference picture for predicting the current picture may also be an anchor picture from another viewpoint.

Figure 3:
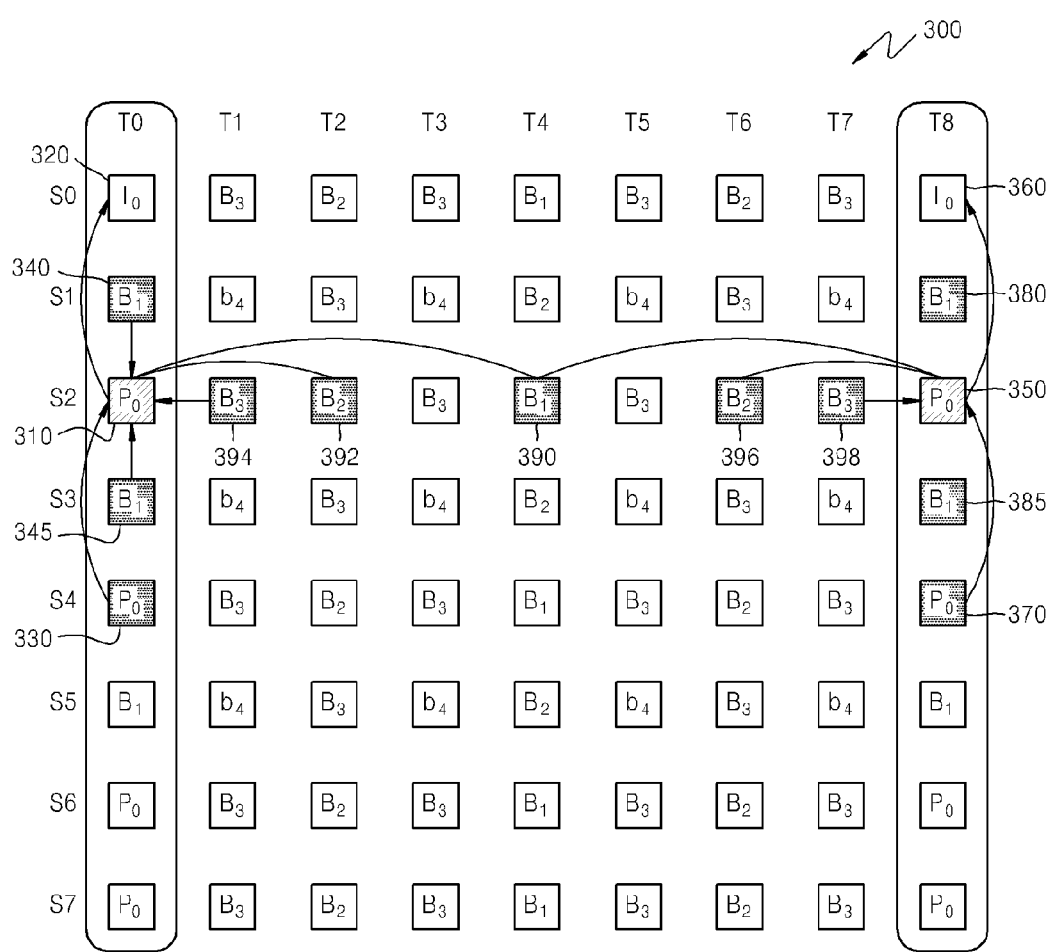
FIG. 3 is a diagram illustrating a method of predicting an anchor picture and other pictures for multi-view video coding/decoding according to an exemplary embodiment.

FIG. 3 is a diagram illustrating a method of predicting an anchor picture and other pictures in multi-view video coding/decoding according to an exemplary embodiment. In the present exemplary embodiment, prediction between pictures is used for multi-view video coding/decoding. Referring to FIG. 3, a set 300 of at least some pictures of multi-view video are examples of pictures predicted when eight viewpoints exist in multi-view video coding/decoding, and a size of group of pictures (GOP) along a time axis is eight. Here, S0 through S7 respectively denote various viewpoints, and T0 through T8 respectively denote times on the time axis.

Prediction is performed using hierarchical B-pictures when coding/decoding pictures from the eight viewpoints on the time axis. Pictures from the viewpoints S0 through S7 at the first time T0 and pictures respectively followed by eight frames, e.g., pictures at the times T8, T16, and T24, may be referred to as anchor pictures.

In this exemplary case, anchor pictures are predicted only in a direction of viewpoints. For example, a picture from the viewpoint S2 is predicted using a picture from the viewpoint S0 at the same point of time, a picture from the viewpoint 51 is predicted using pictures from the viewpoints S0 and S2 at the same point of time, a picture from the viewpoint S4 is predicted using a picture from the viewpoint S2 at the same point of time, a picture from the viewpoint S3 is predicted using pictures from the viewpoints S2 and S4 at the same point of time, a picture from the viewpoint S6 is predicted using a picture from the viewpoint S4 at the same point of time, a picture from the viewpoint S5 is predicted using pictures from the viewpoints S4 and S6 at the same point of time, and a picture from the viewpoint S7 is predicted using a picture from the viewpoint S6 at the same point of time.

Non-anchor pictures are generally predicted along the time axis. Thus, a non-anchor picture is predicted by directly or indirectly referring to an anchor picture of a GOP at the same point of time. Accordingly, a quality of the anchor picture influences a quality of the non-anchor picture and a quality of all the pictures of the same GOP. Therefore, the quality of the anchor picture may be relevant for precise and efficient prediction.

Referring to FIG. 3, a picture $Tn/Sm/X_k$ refers to an X type picture that is captured from an $m^{th}$ viewpoint Sm at an $n^{th}$ time Tn and is to be referred to an anchor picture in a $k^{th}$ order of a series of prediction by referring to the anchor picture. An X type includes at least one of an I type, a B type, and a P type.

For example, if a quality of the anchor pictures $T0/S2/P_0$ 310 and $T8/S2/P_0$ 350 is degraded, an efficiency of predicting the anchor pictures $T0/S1/B_1$ 340, $T0/S3/B_1$ 345, $T0/S4/P_0$ 330, $T8/S1/B_1$ 380, $T8/S3/B_1$ 385, and $T8/S4/P_0$ 370 by directly referring to the anchor pictures $T0/S2/P_0$ 310 and $T8/S2/P_0$ 350 may be lowered, thus causing degradation of the video quality.

Accordingly, an efficiency of predicting the anchor pictures $T0/S5/B_1$, $T0/S6/P_0$, $T8/S5/B_1$, and $T8/S6/P_0$ by referring to the degraded anchor pictures $T0/S4/P_0$ 330, and $T8/S4/P_0$ 370 may also be lowered, thus worsening the video quality.

Also, the efficiency of predicting the anchor pictures $T0/S7/P_0$ and $T8/S7/P_0$ by referring to the degraded anchor pictures $T0/S6/P_0$ and $T8/S6/P_0$ may be lowered, and thus, the video quality may be continuously degraded.

Accordingly, if the quality of anchor pictures is degraded, a quality of non-anchor pictures that are predicted by respectively referring to the anchor pictures is also degraded.

For example, in the exemplary case of temporal prediction on the viewpoint S2, a quality of a non-anchor picture $T4/S2/B_1$ 390 predicted by directly referring to the anchor pictures $T0/S2/P_0$ 310 and $T8/S2/P_0$ 350, non-anchor pictures $T2/S2/B_2$ 392 and $T6/S2/B_2$ 396 predicted by referring to the non-anchor picture $T4/S2/B_1$ 390, and the other $B_3$ pictures $T1/S2/B_3$ 394 and $T7/S2/B_3$ 398 captured from the viewpoint S2, may be degraded.

Thus, the anchor pictures $T0/S2/P_0$ 310 and $T8/S2/P_0$ 350 influence the quality of all the pictures belonging to the GOP, except for pictures from the viewpoint S0, e.g., anchor pictures $T0/S0/I_0$ 320 and $T8/S0/I_0$ 360 to which the anchor pictures $T0/S2/P_0$ 310 and $T8/S2/P_0$ 350 are respectively referring. For this reason, the quality of anchor pictures is relevant to precisely code or decode the GOP.

Also, in multi-view video coding/decoding according to one or more exemplary embodiments, video sequences are captured from various viewpoints through a plurality of cameras. Thus, even if an object is photographed by cameras of the same type, images of the object captured by the cameras may differ from one another according to respective distances between the object and the cameras and respective differences between angles of the object and the cameras. Since such differences vary the degree of reflection of light from the surface of the object, a difference between levels of luminance signals and a difference between levels of chrominance signals may occur in a picture, such as an anchor picture, which is inter-view predicted.

If a chrominance signal level difference is not compensated for although the luminance signal level difference is compensated for, prediction between pictures may cause degradation of video quality due to the chrominance signal level difference to be propagated to another anchor picture or a non-anchor picture.

Also, a skip mode block borrows a corresponding block from a reference frame without coding residual images, and thus may be influenced by the chrominance signal level difference.

FIG. 4A is a flowchart illustrating a method 400 of coding a chrominance compensation value in consideration of a first picture type and a block type, according to an exemplary embodiment. In FIG. 4A, operations of a first picture type determination unit 110, a block type determination unit 120, a chrominance compensation value determination unit 130, a chrominance compensation performing unit 140 and a chrominance compensation value coding unit of a multi-view video coding apparatus 100 according to an exemplary embodiment will be described in detail. In the method 400 of coding the chrominance compensation value, the multi-view video coding apparatus 100 performs chrominance compensation on and codes a current block of a current picture (i.e., an anchor picture), which belongs to a predetermined block type.

Referring to FIG. 4A, the first picture type determination unit 110 determines whether the current picture is an anchor picture and the block type determination unit 120 determines whether the current block is the predetermined block type (operation 410). The predetermined block type may include at least one of a skip mode block, an inter block mode block, and a direct mode block, as described above. If it is determined in operation 410 that the current picture is not an anchor picture or the current block is not the predetermined block type, the multi-view video coding apparatus 100 discontinues the method 400 of coding the chrominance compensation value for the current block.

If the current block is the predetermined block type of an anchor picture, the chrominance compensation value determination unit 130 determines a chrominance compensation value (operation 420). A method of determining the chrominance compensation value according to one or more exemplary embodiments will be described later with reference to FIGS. 17, 21, and 22. The chrominance compensation performing unit 140 performs the chrominance compensation using the chrominance compensation value (operation 430). The chrominance compensation may be performed separately from or simultaneously with performing of motion compensation on the current block. A method of performing chrominance compensation according to one or more exemplary embodiments will be described later with reference to FIG. 18.

The chrominance compensation value coding unit codes the chrominance compensation value and inserts the coding result into a bitstream (operation 440). A method of coding the chrominance compensation value according to one or more exemplary embodiments will be described later with reference to FIGS. 19 and 20. The chrominance compensation value coding unit may operate (operation 440) before the chrominance compensation performing unit 140 operates (operation 430), or these operations (operations 430 and 440) may be performed simultaneously.

FIG. 4B is a flowchart illustrating a method 450 of decoding a chrominance compensation value in consideration of a first picture type and a block type according to an exemplary embodiment. In FIG. 4B, operations of a first picture type interpretation unit 210, a block type interpretation unit 220, a chrominance compensation value interpretation unit 230, and a chrominance compensation performing unit 240 of a multi-view video decoding apparatus 200 according to an exemplary embodiment will be described in detail. In the method 450 of decoding the chrominance compensation value, the multi-view video decoding apparatus 200 performs chrominance compensation on and decodes a current block of a current picture (i.e., an anchor picture), which belongs to a predetermined block type. The multi-view video decoding apparatus 200 may receive a bitstream and may parse video data and information related to video included in the bitstream. The multi-view video decoding apparatus 200 may extract from the bitstream at least one of information regarding a first picture type of the current picture and information regarding a block type of the current block and interpret the same.

Referring to FIG. 4B, the first picture type interpretation unit 210 interprets whether the current picture is an anchor picture and the block type determination unit 220 interprets whether the current block belongs to a predetermined block type (operation 460). As described above, the predetermined block type may include at least one of a skip mode block, an inter block mode block, and a direct mode block. If it is determined in operation 460 that the current picture is not an anchor picture or the current block does not belong to the predetermined block type, the multi-view video decoding apparatus 200 discontinues the method 450 of decoding the chrominance compensation value for the current block.

If the current block is a predetermined block type of an anchor picture, the chrominance compensation value interpretation unit 230 decodes and interprets a chrominance compensation value (operation 470). A method of interpreting the chrominance compensation value according to one or more exemplary embodiments will be described later with reference to FIGS. 17, 21, and 22. The chrominance compensation performing unit 240 performs the chrominance compensation by using the interpreted chrominance compensation value (operation 480). The chrominance compensation may be performed separately from or simultaneously with performing of motion compensation on the current block. A method of performing chrominance compensation according to one or more exemplary embodiments will be described later with reference to FIG. 18.

Even in a skip mode, information of another block is applied to the current block by performing inter prediction on a GOP captured from a same viewpoint as the current picture on the time axis. Multi-view video may be predicted using information of another video on the time axis and information regarding video at different points of time. Thus, if a block in the skip mode belongs to an anchor picture and is predicted based on information regarding a picture captured from another viewpoint at the same point of time, the information of the anchor picture may be delivered in series to all pictures of the multi-view video. Accordingly, the multi-view video can be precisely predicted based on information on differences due to time variation and information on disparity between different viewpoints.

FIGS. 5A and 5B illustrate slice_data syntaxes 500 and 550 for coding/decoding multi-view video by performing chrominance compensation in consideration of a first picture type and a block type, according to one or more exemplary embodiments.

Referring to FIGS. 5A and 5B, the slice_data syntaxes 500 and 550 record various data regarding a slice for coding/decoding multi-view video when a block type is classified into a 16×16 inter block mode, a skip block mode and a direct block mode. The slice_data syntaxes 550 and 550 are divided from one syntax and separately illustrated in FIG. 5A (former part) and FIG. 5B (latter part), on account of limited space.

In the slice_data syntax 500, mb_skip_run 510 is syntax indicating a total number of blocks skipped in series when entropy coding is performed using context-based adaptive variable-length coding (CAVLC) during multi-view video coding/decoding. Referring to a for loop corresponding to anchor_enhancement_information( ) 520 of the slice_data syntax 500, the for loop is performed a number of times corresponding to the total number of skipped macro blocks.

Referring to the if condition corresponding to anchor_enhancement_information( ) 520 of the slice_data syntax 500, when a current picture is an anchor picture, anchor_enhancement_information( ) 520 is added to code or decode chrominance information, such as a chrominance compensation value.

mb_skip_flag 530 of the slice_data syntax 500 is syntax indicating blocks skipped when entropy coding is performed using context-based adaptive binary arithmetic coding (CABAC) during multi-view video coding/decoding. That is, the mb_skip_flag 530 is information indicating whether a current block has been skipped. For example, if the mb_skip_flag 530 has a value of 1, the mb_skip_flag 530 indicates that the current block has been skipped.

The if condition corresponding to anchor_enhancement_information( ) 540 of the slice_data_syntax 500 indicates that the current block has been skipped and anchor_enhancement_information( ) 540 may be added to code or decode the chrominance information when a current picture is an anchor picture. One or more exemplary embodiments of the syntaxes, anchor_enhancement_information( ) 520 and 540 that allow chrominance compensation to be performed when the above if conditions satisfy TRUE, will be described later with reference to FIGS. 19 and 20.

Figures 6B, 7A:
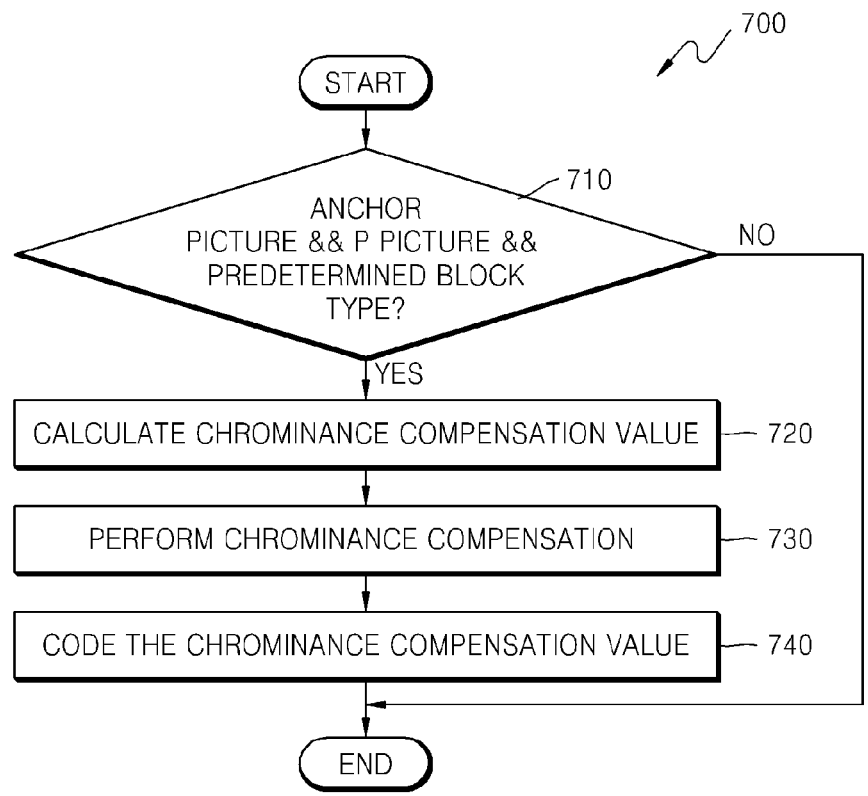

FIGS. 6A and 6B illustrate mb_pred syntaxes 600 and 620 for coding or decoding multi-view video by performing chrominance compensation in consideration of a first picture type and a block type, according to another exemplary embodiment.

Referring to FIGS. 6A and 6B, the mb_pred syntaxes 600 and 620 record various data related to prediction of macro blocks for coding/decoding multi-view video when a block type is classified into a 16×16 inter block mode, a skip block mode and a direct block mode. The mb_pred syntaxes 600 and 650 are divided from one syntax and separately illustrated in FIG. 6A (former part) and FIG. 6B (latter part), on account of limited space.

The if condition corresponding to anchor_enhancement_information( ) 610 of the mb_pred syntax 600 indicates that if a current picture is an anchor picture and a current block is in the 16×16 inter block mode, anchor_enhancement_information( ) 610 may be added to code or decode chrominance information.

The if condition corresponding to anchor_enhancement_information( ) 630 of the mb_pred syntax 620 indicates that if the current picture is an anchor picture and the current block is in the direct block mode, anchor_enhancement_information( ) 630 is added to code or decode chrominance information.

One or more exemplary embodiments of the syntaxes, anchor_enhancement_information( ) 610 and 630 that allow chrominance compensation to be performed when the above if conditions satisfy TRUE, will be described later with reference to FIGS. 19 and 20.

For example, in order to perform coding or decoding for improving a quality of an anchor picture while directly using skip mode syntax of multi-view video coding/decoding, chrominance information is inserted into the skip mode syntax according to information indicating a block type of an M×N block that is to be decoded and information indicating whether a current picture is an anchor picture. Here, M×N may be 16×16, 8×8, or various other number combinations. Since the skip mode syntax may be directly used, it is possible to code or decode multi-view video by changing, for example, only information used for the syntax without greatly changing a structure of a related art multi-view video coding or decoding system.

FIG. 7A is a flowchart illustrating a method 700 of coding a chrominance compensation value in consideration of a first picture type, a second picture type and a block type, according to an exemplary embodiment. In FIG. 7A, operations of a first picture type determination unit 110, a block type determination unit 120, a second picture type determination unit, a chrominance compensation value determination unit 130, a chrominance compensation performing unit 140 and a chrominance compensation value coding unit of a multi-view video coding apparatus 100 according to an exemplary embodiment will be described in greater detail. In the method 700 of coding the chrominance compensation value, the multi-view video coding apparatus 100 performs chrominance compensation on and codes a predetermined block type current block of a current picture which is an anchor picture and a predetermined second type. In the present exemplary embodiment, the second picture type is a P picture type.

Referring to FIG. 7A, the first picture type determination unit 110 determines whether the current picture is an anchor picture, the block type determination unit 120 determines whether the current block is the predetermined block type, and the second picture type determination unit determines whether the current picture is a P picture (operation 710). The predetermined block type may include at least one of a skip mode block, an inter block mode block, and a direct mode block. If the current picture is neither an anchor picture nor a P picture, or the current block is not the predetermined block type, the multi-view video coding apparatus 100 discontinues the method 700 of coding the chrominance compensation value of the current block.

If the current block is a predetermined block type of a P picture which is an anchor picture, the chrominance compensation value determination unit 130 determines a chrominance compensation value (operation 720). A method of determining the chrominance compensation value according to one or more exemplary embodiments will be described later with reference to FIGS. 17, 21, and 22. The chrominance compensation performing unit 140 performs the chrominance compensation using the determined chrominance compensation value (operation 730). The chrominance compensation may be performed separately from or simultaneously with performing of the motion compensation on the current block. A method of performing chrominance compensation according to one or more exemplary embodiments will be described later with reference to FIG. 18.

Figure 7B:
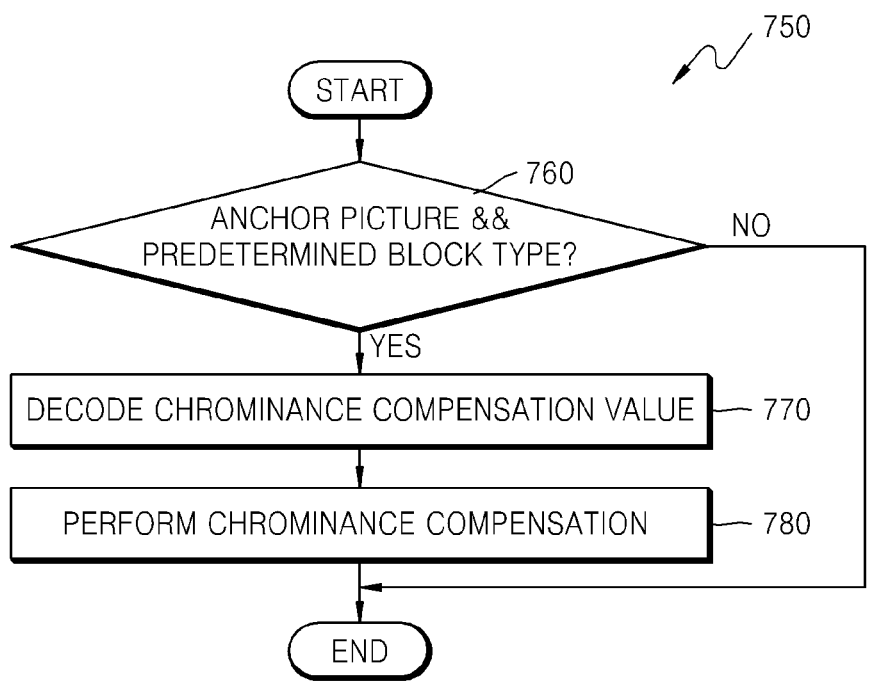
FIG. 7B is a flowchart illustrating a method of decoding a chrominance compensation value in consideration of a first picture type, a second picture type and a block type, according to an exemplary embodiment.

FIG. 7B is a flowchart illustrating a method 750 of decoding a chrominance compensation value in consideration of a first picture type, a second picture type and a block type, according to an exemplary embodiment. In FIG. 7B, operations of a first picture type interpretation unit 210, a second picture type interpretation unit, a block type interpretation unit 220, a chrominance compensation value interpretation unit 230, and a chrominance compensation performing unit 240 of a multi-view video decoding apparatus 200 according to an exemplary embodiment will be described in greater detail. In the method 750 of decoding the chrominance compensation value, the multi-view video decoding apparatus 200 performs chrominance compensation and decodes a predetermined block type current block of a current picture which is an anchor picture and a predetermined second picture type. In the present exemplary embodiment, the second picture type is a P picture type.

The multi-view video decoding apparatus 200 may receive a bitstream and may parse video data and information related to video from the bitstream. Furthermore, the multi-view video decoding apparatus 200 may extract from header information at least one of information indicating first picture type of the current picture or information indicating the block type of the current block, and may interpret the extracted information.

Referring to FIG. 7B, the first picture type interpretation unit 210 interprets whether the current picture is an anchor picture, the second picture type interpretation unit interprets whether the current picture is a P picture, and the block type determination unit 220 interprets whether the current block is a predetermined block type (operation 760). The predetermined block type includes at least one of a skip mode block, an inter block mode block, and a direct mode block. If the current picture is neither an anchor picture nor a P picture or the current block is not the predetermined block type, the multi-view video decoding apparatus 200 discontinues the method 750 of decoding the chrominance compensation value for the current block.

If the current block is a predetermined block type of a P picture, which is an anchor picture, the chrominance compensation value interpretation unit 230 decodes and interprets a chrominance compensation value (operation 770). A method of interpreting and determining the chrominance compensation value according to one or more exemplary embodiments will be described later with reference to FIGS. 17, 21, and 22. The chrominance compensation performing unit 240 performs the chrominance compensation using the interpreted chrominance compensation value (operation 780). The chrominance compensation may be performed separately from or simultaneously with performing of motion compensation on the current block. A method of performing chrominance compensation according to one or more exemplary embodiments will be described later with reference to FIG. 18.

FIG. 8 illustrates slice_data syntax 800 for coding or decoding multi-view video by performing chrominance compensation in consideration of a first picture type, a second picture type, and a block type, according to an exemplary embodiment.

The slice_data syntax 800 illustrated in FIG. 8 is another exemplary embodiment of the slice_data syntaxes 500 and 550 illustrated in FIGS. 5A and 5B, and is the same as or similar to the slice_data syntaxes 500 and 550 except for the following description.

Referring to FIG. 8, the if condition corresponding to anchor_enhancement_information( ) 810 of the slice_data syntax 800 indicates that when a current picture is an anchor picture and a P picture, anchor_enhancement_information( ) 810 which is chrominance information syntax is added to code or decode chrominance information, such as a chrominance compensation value.

The if condition corresponding to anchor_enhancement_information( ) 820 of the slice_data syntax 800 indicates that if the current block is skipped and the current picture is an anchor picture and a P picture, anchor_enhancement_information( ) 820 is added to code or decode chrominance information. One or more exemplary embodiments of the syntaxes, anchor_enhancement_information( ) 810 and 820, that allow chrominance compensation to be performed when the above if conditions satisfy TRUE will be described later with reference to FIGS. 19 and 20.

Figures 9B, 10A:
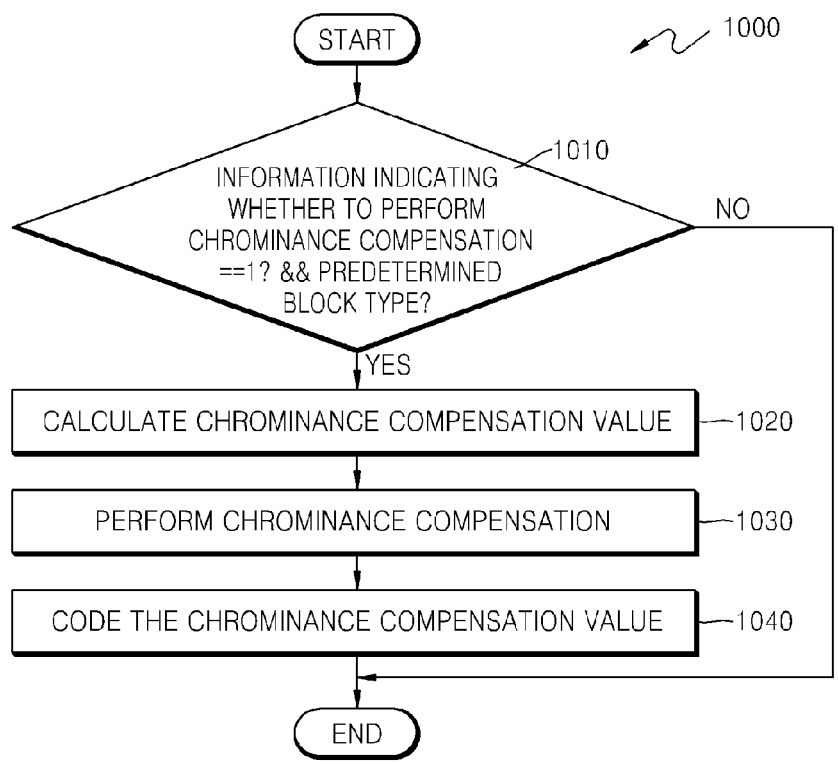

FIGS. 9A and 9B illustrate mb_pred syntaxes 900 and 920 for coding or decoding multi-view video by performing chrominance compensation in consideration of a first picture type, a second picture type and a block type, according to another exemplary embodiment.

The mb_pred syntaxes 900 and 920 illustrated in FIGS. 9A and 9B are another exemplary embodiment of the mb_pred syntax 600 and 620 of FIGS. 6A and 6B and are the same as or similar to the mb_pred syntax 600 and 620 of FIGS. 6A and 6B except for the following description. The mb_pred syntaxes 900 and 920 are divided from one syntax and separately illustrated in FIG. 9A (former part) and FIG. 8B (latter part) on account of limited space.

Referring to FIGS. 9A and 9B, the if condition including anchor_enhancement_information( ) 910 of the mb_pred syntax 900 indicates that when a current picture is an anchor picture and a P picture and a current block is in a 16×16 inter block mode, anchor_enhancement_information( ) 910 is added to code or decode chrominance information.

The if condition including anchor_enhancement_information( ) 930 of the mb_pred syntax 920 indicates that when the current picture is an anchor picture and the current block is in a direct block mode, anchor_enhancement_information( ) 930 is added to code or decode chrominance information.

One or more exemplary embodiments of the syntaxes, anchor_enhancement_information( ) 910 and 930, that allow chrominance compensation to be performed when the above if conditions satisfy TRUE will be described later in detail with reference to FIGS. 19 and 20.

FIG. 10A is a flowchart illustrating a method 1000 of coding a chrominance compensation value based on information indicating whether to perform chrominance compensation and on a block type according to an exemplary embodiment. In FIG. 10A, operations of a first picture type determination unit 110, a chrominance compensation performing determination flag determination unit, a block type determination unit 120, a chrominance compensation value determination unit 130, a chrominance compensation performing unit 140 and a chrominance compensation value coding unit of a multi-view video coding apparatus 100 according to an exemplary embodiment will be described in greater detail. In the method 1000 of coding the chrominance compensation value, if a flag indicating whether to perform the chrominance compensation on a predetermined block type current block of a current picture which is an anchor picture is set, the multi-view video coding apparatus 100 performs the chrominance compensation and codes the performing result.

Referring to FIG. 10A, the first picture type determination unit 110 determines whether the current picture is an anchor picture, the block type determination unit 120 determines whether the current block is a predetermined block type, and the chrominance compensation performing determination unit determines whether to perform chrominance compensation on the current block (operation 1010). The predetermined block type may include at least one of a skip mode block, an inter block mode block, and a direct mode block as described above. If the current picture is not an anchor picture, the current block is not the predetermined block type, or the flag indicating whether to perform chrominance compensation is not set to, for example, 1 (where 1 indicates that the chrominance compensation is to be performed), the multi-view video coding apparatus 100 discontinues the method 1000 of coding the chrominance compensation value for the current block.

If the current block is a predetermined block type of an anchor picture and the flag indicating whether to perform chrominance compensation is set to, for example, 1, the chrominance compensation value determination unit 130 determines the chrominance compensation value (operation 1020). A method of determining the chrominance compensation value according to one or more exemplary embodiments will be described later with reference to FIGS. 17, 21, and 22. The chrominance compensation performing unit 140 performs the chrominance compensation using the determined chrominance compensation value (operation 1030). The chrominance compensation may be performed separately from or simultaneously with performing of motion compensation on the current block. A method of performing chrominance compensation according to one or more exemplary embodiments will be described later with reference to FIG. 18.

Figures 10B, 11:
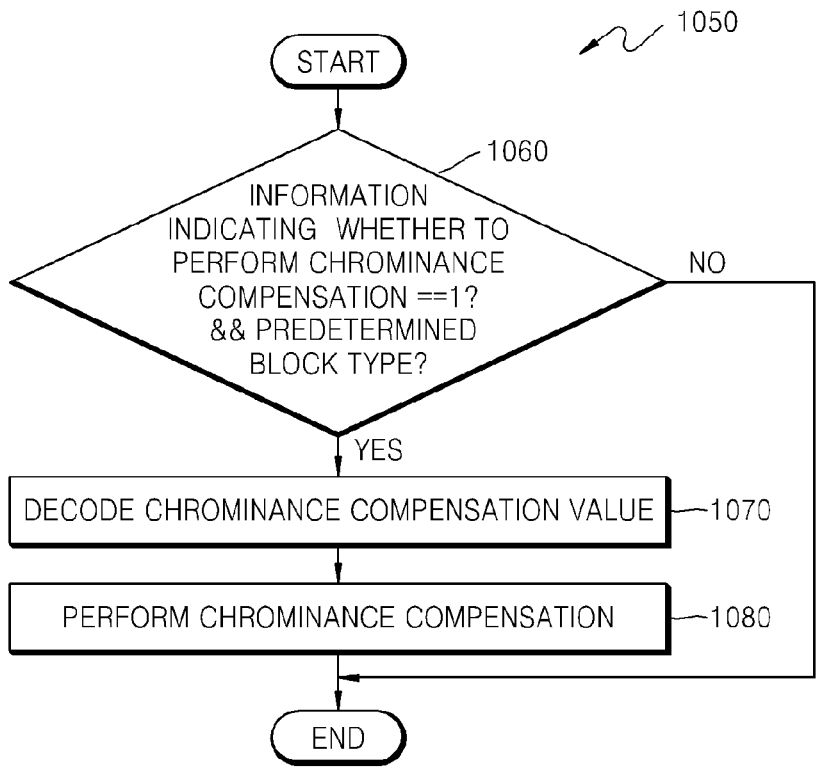
FIG. 10B is a flowchart illustrating a method of decoding a chrominance compensation value based on information indicating whether to perform chrominance compensation and on a block type, according to an exemplary embodiment.
FIG. 11 illustrates syntax indicating whether to perform chrominance compensation according to an exemplary embodiment.

FIG. 10B is a flowchart illustrating a method 1050 of decoding a chrominance compensation value based on information indicating whether to perform chrominance compensation and on a block type according to an exemplary embodiment. In FIG. 10B, operations of a first picture type interpretation unit 210, a chrominance compensation performing determination flag interpretation unit, a block type interpretation unit 220, a chrominance compensation value interpretation unit 230, and a chrominance compensation performing unit 240 of a multi-view video decoding apparatus 200 according to an exemplary embodiment will be described in detail. In the method 1050, the multi-view video decoding apparatus 200 performs the chrominance compensation and decodes a result of the performing of the chrominance compensation when a flag indicating whether to perform the chrominance compensation on a predetermined block type current block of a current picture which is an anchor picture is set to, for example, 1.

The multi-view video decoding apparatus 200 may receive a bitstream and may parse video data and information related to video from the bitstream. Moreover, the multi-view video decoding apparatus 200 may extract at least one of information indicating a first picture type of the current picture and information indicating a block type of the current block from header information.

Referring to FIG. 10B, the first picture type interpretation unit 210 interprets whether the current picture is an anchor picture, the block type determination unit 220 interprets whether the current block is a predetermined block type, and the chrominance compensation performing determination flag interpretation unit interprets whether the flag indicating whether to perform the chrominance compensation is set to indicate that chrominance compensation is to be performed (operation 1060). The predetermined block type may include at least one of a skip mode block, an inter block mode block, and a direct mode block as described above. If the current picture is not an anchor picture, the current block is not the predetermined block type, or the flag indicating whether to perform chrominance compensation is set to 0, the multi-view video decoding apparatus 200 discontinues the method 1050 for the current block.

If the current block is a predetermined block type of an anchor picture and the flag indicates that chrominance compensation is to be performed, the chrominance compensation value interpretation unit 230 decodes and interprets the chrominance compensation value (operation 1070). A method of interpreting and determining the chrominance compensation value according to one or more exemplary embodiments will be described later with reference to FIGS. 17, 21, and 22. The chrominance compensation performing unit 240 performs the chrominance compensation using the interpreted chrominance compensation value (operation 1080). The chrominance compensation may be performed separately from or simultaneously with performing of motion compensation on the current block. A method of performing the chrominance compensation according to one or more exemplary embodiments will be described later with reference to FIG. 18.

FIG. 11 illustrates syntax slice_header 1100 indicating whether to perform chrominance compensation according to an exemplary embodiment.

The slice_header syntax 1100 illustrated in FIG. 11 is an exemplary embodiment of syntax for coding or decoding multi-view video, which records various header data regarding a slice.

Referring to FIG. 11, the if condition including use_chroma_offset_flag 1110 the slice_header syntax 1100 indicates that if a current picture is an anchor picture, use_chroma_offset_flag 1110 which is syntax of a flag indicating whether to perform the chrominance compensation may be added. If the chrominance compensation is to be performed, the use_chroma_offset_flag 1110 is set to, for example, 1. If chrominance compensation is not to be performed, the use_chroma_offset_flag 1110 is set to 0. Also, if the current picture is not an anchor picture, it may be assumed that the use_chroma_offset_flag 1110 is 0.

Various exemplary methods of setting the use_chroma_offset_flag_1110, i.e., the flag indicating whether to perform chrominance compensation, will be described later.

If an absolute value of a difference between an average of pixel values of the current picture and an average of pixel values of a reference video of the current picture is determined for each of Y, U and V components, the flag may be set based on a combination of the absolute values of the respective Y, U and V components.

For example, the flag may be set to 1 when the sum of absolute values of the differences between averages of pixel values of the current picture and the reference video for each of the respective Y, U and V components is greater than a predetermined threshold T. For example, the threshold T may be set to be equal to or greater than 1, that is, $T \geq 1$.

Furthermore, the flag may be set to 1 when the absolute values of the difference between the averages of the pixel values of the current picture and the reference video for each of the U and V components are respectively greater than thresholds $T_U$ and $T_V$. For example, the thresholds $T_U$ and $T_V$ may be equal to or greater than 1, that is, $T_U \geq 1$, $T_V \geq 1$.

Moreover, the flag may be set based on various combinations of squares of the absolute values of the differences between the averages of the pixel values of the current picture and the reference video for each of the Y, U and V components.

For example, if a square root of a sum of squares of the absolute values of the difference between the average of the pixel values of the current picture and the average of the pixel values of the reference video, of the respective Y, U and V components, i.e., $K=SQRT(K_Y^2+K_U^2+K_V^2)$, is greater than a predetermined threshold T, the flag may be set to 1. As another example, if an average of the squares of the absolute values of the differences between the averages of the pixel values of the current picture and the averages of the pixel values of the reference video, of the respective Y, U and V components, i.e., $K=average(K_Y^2+K_U^2+K_V^2)$ is greater than the predetermined threshold T, the flag may be set to 1. Otherwise, the flag may be determined in various other ways.

Also, the flag may be set based on a quantization parameter QP of the current block. If the quantization parameter QP is less than or equal to a critical quantization parameter $QP_T$, the flag may be set to 1. If the quantization parameter QP is greater than the critical quantization parameter $QP_T$, the flag may be set to 0.

Furthermore, the flag may be set based on user input.

Moreover, the flag may be set by using a combination of the above six exemplary methods.

FIG. 12 illustrates slice_data syntax 1200 for coding or decoding multi-view video by performing chrominance compensation in consideration of information indicating whether to perform chrominance compensation and of a block type, according to an exemplary embodiment.

The slice_data syntax 1200 illustrated in FIG. 12 is another exemplary embodiment of the slice_data syntaxes 500 and 550 of FIGS. 5A and 5B, and is the same as or similar to the slice_data syntaxes 500 and 550 except for the following description.

Referring to FIG. 12, the if condition corresponding to anchor_enhancement_information( ) 1210 of the slice_data syntax 1200 indicates that if a current block is a skip mode block and use_chroma_offset_flag (i.e., a flag indicating whether to perform chrominance compensation) is, for example, 1, chrominance information syntax, anchor_enhancement_information( ) 1210 is added to code or decode chrominance information, such as a chrominance compensation value.

The if condition corresponding to anchor_enhancement_information( ) 1220 of the slice_data syntax 1200 indicates that when the current block is skipped and the use_chroma_offset_flag is 1, anchor_enhancement_information( ) 1220 is added to code or decode the chrominance information. One or more exemplary embodiments of the syntaxes, anchor_enhancement_information( ) 1210 and 1220, that allow chrominance compensation to be performed when the above if conditions satisfy TRUE will be described later with reference to FIGS. 19 and 20.

FIGS. 13A and 13B illustrate mb_pred syntaxes 1300 and 1320 for coding or decoding multi-view video by performing chrominance compensation in consideration of information indicating whether to perform chrominance compensation and of a block type, according to another exemplary embodiment.

The mb_pred syntaxes 1300 and 1320 illustrated in FIGS. 13A and 13B are an exemplary embodiment of the mb_pred syntaxes 600 and 620 of FIGS. 6A and 6B. The mb_pred syntaxes 1300 and 1320 are divided from one syntax and separately illustrated in FIG. 13A (former part) and FIG. 13B (latter part) on account of limited space.

Referring to FIGS. 13A and 13B, the if condition corresponding to anchor_enhancement_information( ) 1310 of the mb_pred syntax 1300 indicates that when a current block is in a 16×16 inter block mode and a flag indicating whether to perform chrominance compensation is, for example, 1, anchor_enhancement_information( ) 1310 is added to code or decode chrominance information.

The if condition corresponding to anchor_enhancement_information( ) 1330 of the mb_pred syntax 1320 indicates that when the current block is in a direct block mode and the flag is 1, anchor_enhancement_information( ) 1330 is added to code or decode the chrominance information.

One or more exemplary embodiments of the syntaxes, anchor_enhancement_information( ) 1310 and 1330, that allow chrominance compensation to be performed when the above if conditions satisfy TRUE will be described later with reference to FIGS. 19 and 20.

Figure 14:
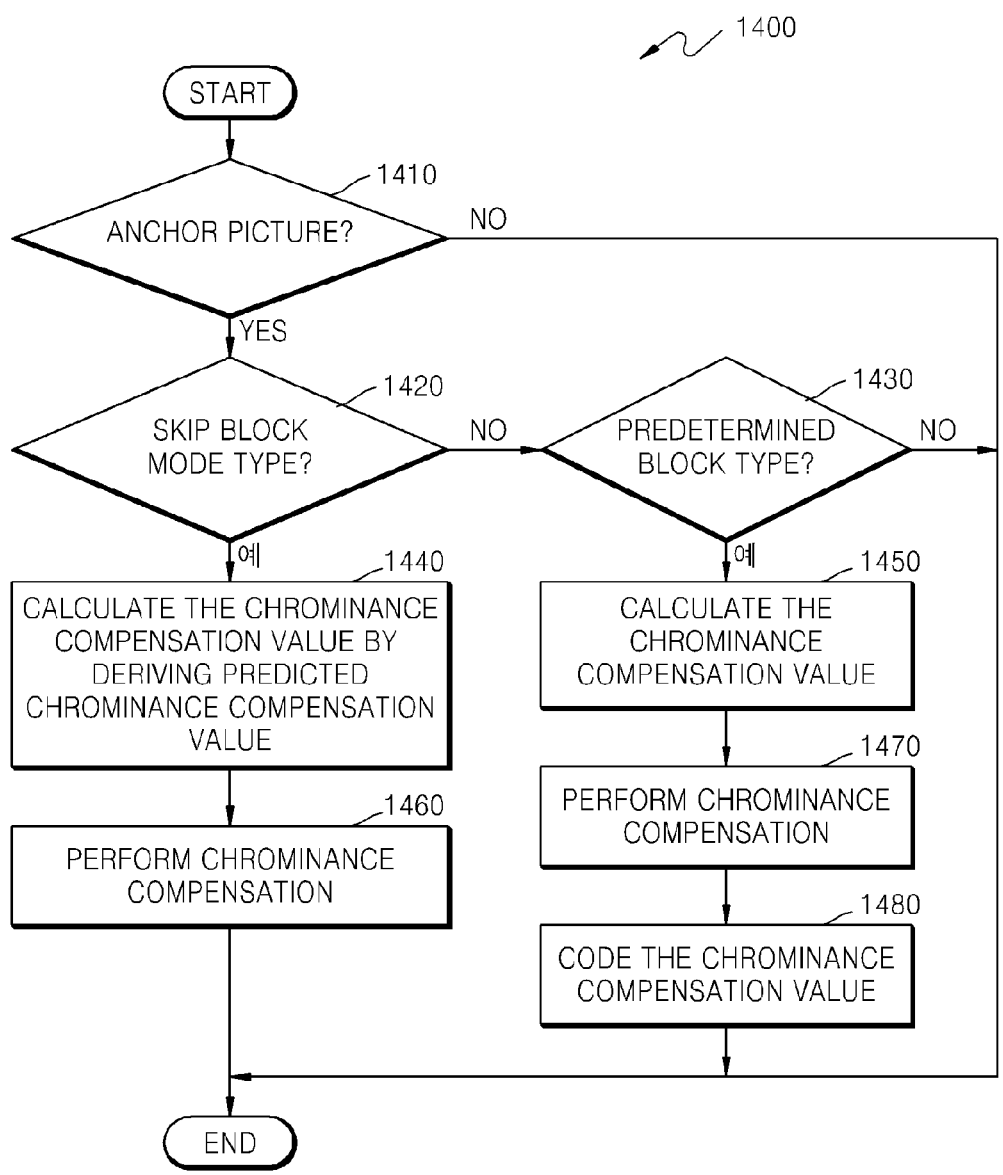
FIG. 14 is a flowchart illustrating a method of coding multi-view video by determining a chrominance compensation value based on a block type, according to an exemplary embodiment.

FIG. 14 is a flowchart illustrating a method 1400 of coding multi-view video by determining a chrominance compensation value based on a block type, according to an exemplary embodiment. In FIG. 14, operations of a first picture type determination unit 110, a block type determination unit 120, a chrominance compensation value determination unit 130, a chrominance compensation performing unit 140 and a chrominance compensation value coding unit of a multi-view video coding apparatus 100 according to an exemplary embodiment will be described in greater detail. In the method 140, the multi-view video coding apparatus 100 performs chrominance compensation by determining a chrominance compensation value according to the block type of a current block of a current picture which is an anchor picture and codes the performing result.

Referring to FIG. 14, the first picture type determination unit 110 determines whether the current picture is an anchor picture (operation 1410). If the current picture is not an anchor picture, the method 1400 of coding the multi-view video is discontinued. If the current picture is an anchor picture, the block type determination unit 120 determines whether the current block is a skip mode block (operation 1420). If the current block is not a skip mode block, whether the current block is a predetermined block type is determined (operation 1430). The predetermined block type may include at least one of an inter block mode block and a direct mode block but not the skip mode block. If the current block is not the predetermined block type, the multi-view video coding apparatus 100 discontinues the method 1400 of coding the multi-view video.

If the current block is a skip mode block of an anchor picture, the chrominance compensation value determination unit 130 determines a chrominance compensation value of the current block by deriving a predicted value of the chrominance compensation value from a chrominance compensation value of a neighboring block (operation 1440). A method of deriving the chrominance compensation value according to one or more exemplary embodiments will be described later with reference to FIGS. 21 and 22. The chrominance compensation performing unit 140 performs the chrominance compensation using the derived chrominance compensation value (operation 1460). The chrominance compensation may be performed separately from or simultaneously with performing of motion compensation on the current block.

If the current block is a predetermined block type of an anchor picture, the chrominance compensation value determination unit 130 determines the chrominance compensation value by using chrominance compensation (operation 1450). A method of directly determining the chrominance compensation value by using the chrominance compensation according to one or more exemplary embodiments will be described later with reference to FIGS. 17, 21, and 22. The chrominance compensation performing unit 140 performs the chrominance compensation by using the chrominance compensation value determined using the chrominance compensation (operation 1470). The chrominance compensation may be performed separately from or simultaneously with performing of motion compensation on the current block. A method of performing the chrominance compensation according to one or more exemplary embodiments will be described later with reference to FIG. 18.

The chrominance compensation value coding unit codes the chrominance compensation value determined using the chrominance compensation and inserts the coding result into a bitstream (operation 1480). A method of coding the chrominance compensation value according to one or more exemplary embodiments will be described later with reference to FIGS. 19 and 20. According to one or more exemplary embodiments, the multi-view video coding apparatus 100 may perform the operation (operation 1480) of the chrominance compensation value coding unit before performing the operation (operation 1470) of the chrominance compensation performing unit 140, or perform these operations (operations 1470 and 1480) simultaneously.

Figure 15:
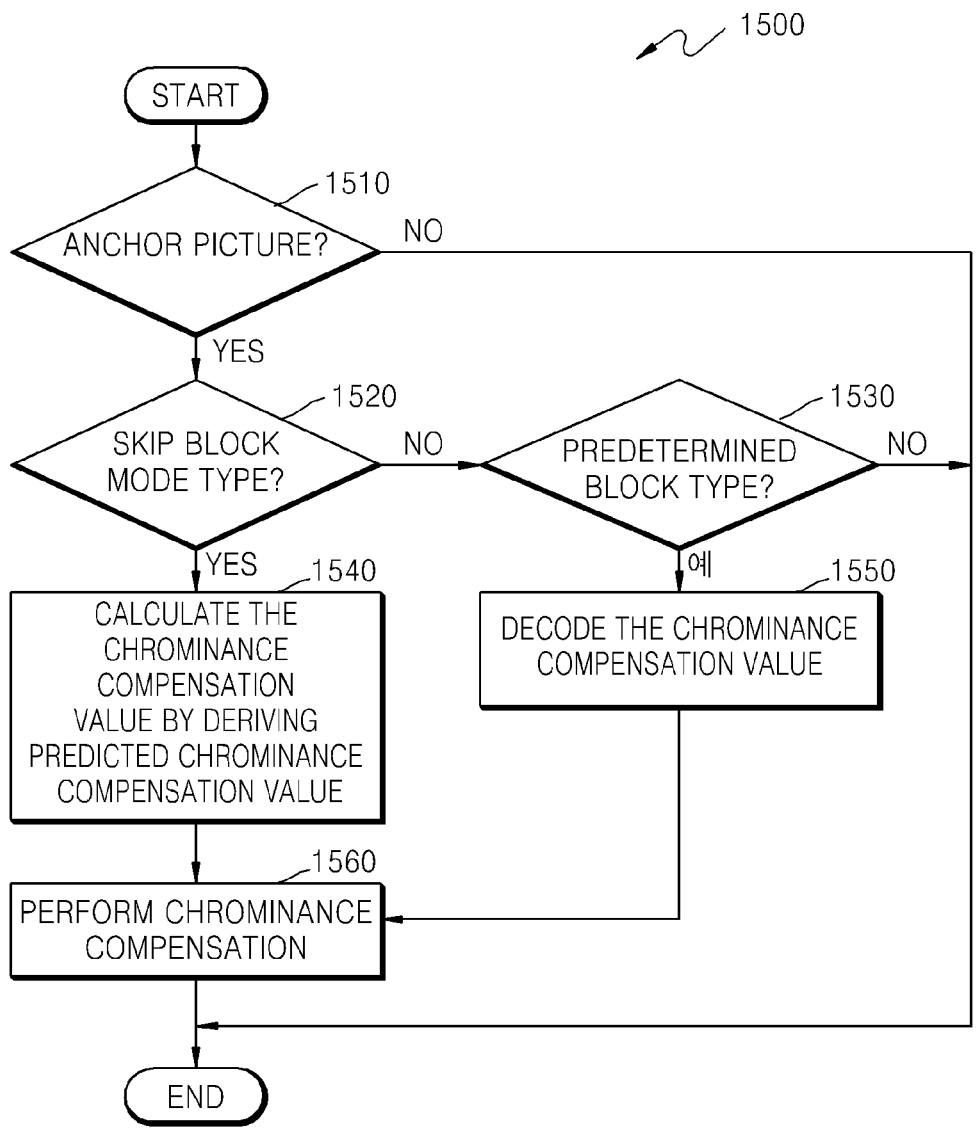
FIG. 15 is a flowchart illustrating a method of decoding multi-view video by determining a chrominance compensation value based on a block type, according to an exemplary embodiment.

FIG. 15 is a flowchart illustrating a method 1500 of decoding multi-view video by determining a chrominance compensation value based on a block type, according to an exemplary embodiment. In FIG. 15, operations of a first picture type interpretation unit 210, a block type interpretation unit 220, a chrominance compensation value interpretation unit 230, and a chrominance compensation performing unit 240 of a multi-view video decoding apparatus 200 according to an exemplary embodiment will be described in greater detail. In the method 1500 of decoding multi-view video, the multi-view video decoding apparatus 200 performs chrominance compensation and decodes the performing result by determining a chrominance compensation value according to the block type of a current block of a current picture which is an anchor picture.

The multi-view video decoding apparatus 200 may receive a bitstream and may parse video data and information related to video from the bitstream. Moreover, the multi-view video decoding apparatus 200 may extract at least one of information indicating a first picture type of the current picture and information indicating the block type of the current block from header information.

Referring to FIG. 15, the first picture type interpretation unit 210 determines whether the current picture is an anchor picture (operation 1510). If the current picture is not an anchor picture, the method 1500 of decoding the multi-view video is discontinued. If the current picture is an anchor picture, the block type interpretation unit 220 interprets whether the current block is a skip mode block (operation 1520). If the current block is not a skip mode block, whether the current block is a predetermined block type is interpreted (operation 1530). The predetermined block type may include at least one of an inter block mode block and direct mode block, but not the skip mode block. If the current block is not the predetermined block type, the multi-view video decoding apparatus 200 discontinues the method 1500 of decoding the multi-view video for the current block.

If the current block is a skip mode block of an anchor picture, the chrominance compensation value interpretation unit 230 determines the chrominance compensation value of the current block by deriving a predicted value of the chrominance compensation value from a chrominance compensation value of a neighboring block (operation 1540). A method of deriving the chrominance compensation value according to one or more exemplary embodiments will be described later with reference to FIGS. 21 and 22. The chrominance compensation performing unit 240 performs the chrominance compensation by using the derived chrominance compensation value (operation 1560).

If the current block is a predetermined block type of an anchor picture, the chrominance compensation value interpretation unit 230 determines the chrominance compensation value by using chrominance compensation (operation 1550). A method of directly determining the chrominance compensation value by using chrominance compensation according to one or more exemplary embodiments will be described later with reference to FIGS. 17, 21, and 22. The chrominance compensation performing unit 240 performs the chrominance compensation using the chrominance compensation value determined by using the chrominance compensation (operation 1560).

The chrominance compensation may be performed separately from or simultaneously with performing of motion compensation on the current block. A method of performing the chrominance compensation according to one or more exemplary embodiments will be described later with reference to FIG. 18.

FIGS. 16A and 16B illustrate mb_pred syntaxes 1600 and 1620 for coding or decoding multi-view video by performing chrominance compensation in consideration of information indicating whether to perform chrominance compensation and of a block type, according to an exemplary embodiment.

The mb_pred syntaxes 1600 and 1620 illustrated in FIGS. 16A and 16B are another exemplary embodiment of the mb_pred syntaxes 600 and 620 illustrated in FIGS. 6A and 6B. The mb_pred syntaxes 1600 and 1620 are divided from one syntax and separately illustrated in FIG. 16A (former part) and FIG. 16B (latter part) on account of space consideration.

Referring to FIGS. 16A and 16B, the if condition corresponding to anchor_enhancement_information( ) 1610 of the mb_pred syntax 1600 indicates that when a current block is in a 16×16 inter block mode and a current picture is an anchor picture, anchor_enhancement_information( ) 1610 is added to code or decode chrominance information.

The if condition corresponding to anchor_enhancement_information( ) 1630 of the mb_pred syntax 1620 indicates when the current block is in a direct block mode and the current picture is an anchor picture, anchor_enhancement_information( ) 1630 is added to code or decode the chrominance information.

One or more exemplary embodiments of the syntaxes, anchor_enhancement_information( ) 1610 and 1630, that allow the chrominance compensation to be performed when the above if conditions satisfy TRUE will be described later with reference to FIGS. 19 and 20.

Unlike the above mb_pred syntax 1600, syntax for when the current block is a skip mode block does not additionally exist. If the current block is a skip mode block, a chrominance compensation value is determined by deriving a predicted value of the chrominance compensation value from a chrominance compensation value of a neighboring block. The chrominance compensation is performed using the derived chrominance compensation value.

FIG. 17 illustrates equations 1700 and 1710 for determining a chrominance compensation value according to an exemplary embodiment. A chrominance compensation value determination unit 130 of a multi-view video coding apparatus 100 and a chrominance compensation value interpretation unit 230 of a multi-view video decoding apparatus 200 according to exemplary embodiments may determine the chrominance compensation value by using the following various methods.

Referring to FIG. 17, in the equation 1700 for calculating a chrominance compensation value of a U component and the equation 1710 for calculating a chrominance compensation value of a V component, $offset_{cb}$ and $offset_{cr}$ respectively denote the chrominance compensation values of the U and V components. M and N respectively denote width and height sizes of a block. $f_{cb}(i,j)$ and $f_{cr}(i,j)$ respectively denote values of U and V components of a pixel of the original block that is to be coded. $r_{cb}(i,j)$ and $r_{cr}(i,j)$ respectively denote values of U and V components of a pixel of a reference block corresponding to a motion vector estimated from a current block. i and j respectively denote vertical and horizontal pixel coordinates of a block. That is, a chrominance compensation value $offset_{cb}$ and $offset_{cr}$ of chrominance information of each of U and V components may be calculated by averaging differences between all chrominance pixel values of a block for each of U and V components.

According to another exemplary embodiment, if two or more reference blocks correspond to a current block or two or more motion vectors are present, a chrominance compensation value for each of the reference blocks may be calculated by averaging differences between chrominance pixels value of the current block and chrominance pixel values of each reference block. The chrominance compensation values for the reference blocks may be separately coded and inserted into a bitstream that is to be transmitted.

According to another exemplary embodiment, if two or more reference blocks correspond to a current block or two or more motion vectors are present, a chrominance compensation value of the current block may be calculated by generating a representative reference block corresponding to the current block and averaging differences between chrominance pixels of the representative reference block and chrominance pixels of the current block. The representative reference block may be obtained from a combination of pixels of the two or more reference block. For example, the representative reference block may be obtained by interpolating a preceding reference block and a following reference block.

FIG. 18 illustrates equations 1810 and 1820 for performing chrominance compensation according to an exemplary embodiment. A chrominance compensation performing unit 140 of a multi-view video coding apparatus 100 and a chrominance compensation performing unit 240 of a multi-view video decoding apparatus 200 according to exemplary embodiments may perform chrominance compensation on a current block by using the following various methods.

Referring to FIG. 18, in the equation 1810 for calculating a chrominance compensation value of a U component and the equation 1820 for calculating a chrominance compensation value of a V component, $offset_{cb}$ and $offset_{cr}$ respectively denote the chrominance compensation values of the U and V components. $r_{cb}(i,j)$ and $r_{cr}(i,j)$ respectively denote values of U and V components of a pixel of a reference block corresponding to a motion vector estimated from a current block.

$r_{cb}(i,j)$ and $r_{cr}(i,j)$ respectively denote blocks obtained by performing chrominance compensation on the values of the U and V components of a pixel of the reference block (or a representative reference block generated from two or more motion vectors). i and j respectively denote the horizontal and vertical pixel coordinates of a block.

For example, in the case of chrominance compensation using a chrominance compensation value, the chrominance compensation may be performed by respectively adding chrominance compensation values of the respective U and V chrominance components to pixels of chrominance components of the reference block (or a representative reference block generated from two or more motion vectors).

According to another exemplary embodiment, if two or more reference blocks correspond to the current block or two or more motion vectors are present, the chrominance compensation may be performed by adding the chrominance compensation value of each of the chrominance components to pixel values of each of the chrominance components of each of the reference blocks.

According to another exemplary embodiment, if two or more reference blocks correspond to the current block or two or more motion vectors are present, the chrominance compensation may be performed by generating a representative reference block corresponding to the current block and adding the chrominance compensation value of each of the chrominance components to chrominance pixels of the representative reference block. The representative reference block may be obtained from a combination of pixels of the reference blocks. For example, the representative reference block may be obtained by interpolating a preceding reference block and a following reference block.

Figures 19, 20, 21:
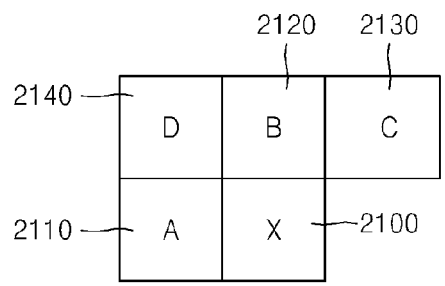
FIG. 19 illustrates syntax for coding or decoding multi-view video by determining a chrominance compensation value of each of chrominance components, according to an exemplary embodiment.
FIG. 20 illustrates syntax for coding or decoding multi-view video by determining a chrominance compensation value of each of color components, according to another exemplary embodiment.
FIG. 21 illustrates neighboring blocks for deriving a chrominance compensation value of a current block, according to an exemplary embodiment.

FIG. 19 illustrates anchor_chroma_information( ) syntax 1900 for coding or decoding multi-view video by determining a chrominance compensation value of each of chrominance components, according to an exemplary embodiment.

A chrominance compensation value coding unit of the multi-view video coding apparatus 100 and a multi-view video decoding apparatus 200 according to exemplary embodiments may use a chrominance compensation value by using the following syntax and a coding or decoding method.

In an exemplary embodiment, the chrominance compensation value may be coded by deriving a predicted value of the chrominance compensation value from neighboring blocks according to the following equation (1), and coding a chrominance compensation difference value that is a difference between the predicted value and the chrominance compensation value:

$$\text{chrominance compensation difference value} = \text{chrominance compensation value} - \text{predicted value of the chrominance compensation value} \quad (1)$$

Referring to FIG. 19, the anchor_chroma_information( ) 1900 syntax is syntax for coding or decoding multi-view video, i.e., for compensating for a chrominance signal in an anchor picture. cb_offset 1910 and cr_offset 1920 respectively denote chrominance compensation difference values of U and V components. The chrominance compensation value may be coded or decoded using universal VLC (UVLC) or CABAC.

The multi-view video decoding apparatus 200 receiving the chrominance compensation difference value as chrominance information may calculate the chrominance compensation value by combining the chrominance compensation difference value and the predicted value of the chrominance compensation value according to the following equation (2):

$$\text{chrominance compensation value} = \text{predicted value of chrominance compensation value} + \text{chrominance compensation difference value} \quad (2)$$

A method of deriving the predicted value of the chrominance compensation value according to one or more exemplary embodiments will be described later with reference to FIGS. 21 and 22.

FIG. 20 illustrates anchor_chroma_information( ) syntax 2000 for coding or decoding multi-view video by determining a chrominance compensation value of each of color components, according to another exemplary embodiment.

A chrominance compensation value coding unit of a multi-view video coding apparatus 100 and a multi-view video decoding apparatus 200 according to exemplary embodiments may use the chrominance compensation difference value according to the following syntax and a coding or decoding method.

When chrominance compensation difference values are coded and transmitted as chrominance information, a flag indicating whether to use a chrominance compensation difference value may be transmitted together with each of the chrominance compensation difference values. For example, if the flag is 1, the corresponding chrominance compensation difference value is transmitted, and if the flag is 0, the corresponding chrominance compensation difference value is not transmitted.

Referring to FIG. 20, the anchor_chroma_information( ) syntax 2000 is syntax for performing the method of coding or decoding multi-view video, which is another exemplary embodiment of syntax for compensating for a chrominance signal in an anchor picture.

cb_offset_flag 2010 and cr_offset_flag 2020 are flags respectively indicating whether to code or decode chrominance compensation difference values of U and V components.

cb_offset 2030 is set when cb_offset_flag 2010 satisfies TRUE, i.e., when the chrominance compensation difference value of the U component is set to be used. Likewise, cr_offset 2040 is set when the cr_offset_flag 2020 satisfies TRUE, i.e., when the chrominance compensation difference value of the V component is set to be used.

Thus, when the cb_offset_flag 2010 (of the cr_offset_flag 2020) is set to 1, the multi-view video coding apparatus 100 may code and transmit the cb_offset 2030 (or the cr_offset 2040) and the multi-view video decoding apparatus 200 may decode the cb_offset 2030 (or the cr_offset 2040) and use the chrominance compensation difference value of the U (or V) component when performing the chrominance compensation.

The chrominance compensation values may be coded or decoded using UVLC or CABAC.

For example, a chrominance compensation value may be determined by deriving a predicted chrominance compensation value of a current block from neighboring blocks of the current block and the predicted value and determining the predicted value as the chrominance compensation value of the current block, for each of the chrominance components. A method of deriving a predicted chrominance compensation value of a current block from neighboring blocks of the current block according to one or more exemplary embodiments will now be described in detail with reference to FIGS. 21 and 22.

FIG. 21 illustrates neighboring A through D blocks 2110 to 2130 of a current block 2100, from which a chrominance compensation value is derived, according to an exemplary embodiment.

Referring to FIG. 21, a predicted chrominance compensation value of the current block (X block) 2100 may be determined using the A block 2110, the B block 2120, the C block 2130 and the D block 2140, which are previously image-processed and, thus, have already undergone chrominance compensation from among neighboring blocks encircling the current block (X block) 2100. The A block 2110 is located at the left side of the current block 2100, the B block 2120 is located at the upper middle side of the current block 2100, the C block 2130 is located at the upper right side of the current block 2100, and the D block 2140 is located to the upper left side of the current block 2100.

Figure 22:
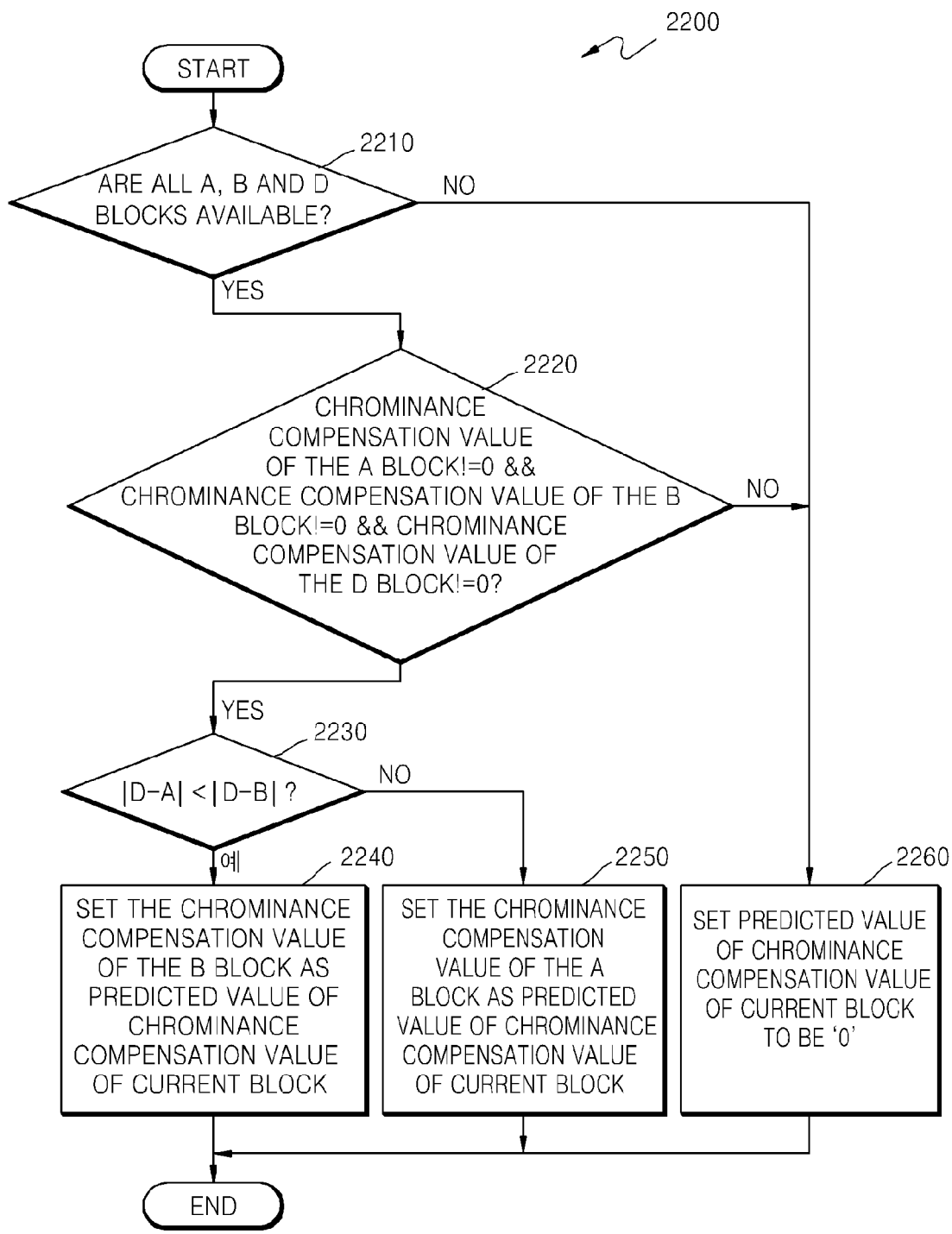
FIG. 22 is a flowchart illustrating a method of deriving a chrominance compensation value of a current block from neighboring blocks according to an exemplary embodiment.

FIG. 22 is a flowchart illustrating a method of deriving a chrominance compensation value of a current block from neighboring blocks according to an exemplary embodiment.

In the present exemplary embodiment, a chrominance compensation value derivation unit of a chrominance compensation value determination unit uses a directionality-based method of determining a chrominance compensation value of the current block X block 2100 by using the A block 2110, the B block 2120, and the D block 2140, which are neighboring blocks illustrated in FIG. 21. That is, a predicted value of the chrominance compensation value of the X block 2100 is determined using the directionality of the A block 2110, the B block 2120, and the D block 2140.

Referring to FIG. 22, in operation 2210, it is determined whether all of the A block 2110, the B block 2120, and the D block 2140 can be used. If all of these blocks 2110, 2120, and 2140 can be used, the method proceeds to operation 2220. If all these blocks 2110, 2120, and 2140 cannot be used, the method proceeds to operation 2260 and the predicted value of the chrominance compensation value of the X block 2100 is set to 0. For example, if a neighboring block is located beyond a picture or a slice, the neighboring block is unavailable.

In operation 2220, if any one of the chrominance compensation values of the A block 2110, the B block 2120, and the D block 2140 is not 0, the method proceeds to operation 2230. If at least one of the A block 2110, the B block 2120, and the D block 2140 has the chrominance compensation value of 0, the method proceeds to operation 2260 and the predicted value of the chrominance compensation value of the X block 2100 is set to 0.

For example, if a neighboring block is an intra block, the chrominance compensation value of the X block 2100 is set to 0. As another example, a chrominance compensation value of a block that does not undergo chrominance compensation is set to 0.

In operation 2230, an absolute value of a difference between pixel values of the D block 2140 and the A block 2110 and an absolute value of a difference between pixel values of the D block 2140 and the B block 2120 are compared with each other. If a result of the comparison reveals that the absolute value of the difference between the pixel values of the D block 2140 and the A block 2110 is less than the absolute value of the difference between the pixel values of the D block 2140 and the B block 2120 (i.e., if |D−A|<|D−B|), the method proceeds to operation 2240. If the result of the comparison reveals that the absolute value of the difference between the pixel values of the D block 2140 and the A block 2110 is equal to or greater than the absolute value of the difference between the pixel values of the D block 2140 and the B block 2120 (i.e., if |D−A|<|D−B|), the method proceeds to operation 2250.

In operation 2240, the chrominance compensation value of the B block 2120 is determined as the predicted value of the chrominance compensation value of the X block 2100. That is, since the absolute value of the difference between the pixel values of the D block 2140 and the A block 2110 is less than the absolute value of the difference between the pixel values of the D block 2140 and the B block 2120, it may be assumed that the D block 2140 and the A block 2110 are located on a same line and the B block 2120 and the X block 2100 are located on a same line in parallel with the line on which the D block 2140 and the A block 2110 are located.

In operation 2250, the chrominance compensation value of the A block 2110 is determined as the predicted value of the chrominance compensation value of the X block 2100. That is, since the absolute value of the difference between the pixel values of the D block 2140 and the A block 2110 is less than the absolute value of the difference between the pixel values of the D block 2140 and the B block 2120, it may be assumed that D block 2140 and the B block 2120 are located on the same line and the A block 2110 and the X block 2100 are located on the same line on which the D block 2140 and the B block 2120 are located (directionality-based method)

In another exemplary method of deriving a predicted chrominance compensation value from neighboring blocks (median deriving method), all the A block 2110, the B block 2120, the C block 2130 and the D block 2140 are basically used as neighboring blocks. If the C block 2130 is not available, the D block 2140 may be used instead.

If only one of the A block 2110, the B block 2120, and the C block 2130 has a reference index as the X block 2100, a chrominance compensation value of the block having the same index is set as a predicted value of the chrominance compensation value of the X block 2100. If two or more blocks of these blocks have the same index as the X block 2100, a median value of chrominance compensation values of the A block 2110, the B block 2120, and the C block 2130 is set as a predicted value of the chrominance compensation value of the X block 2100.

If a neighboring block is an intra block, the chrominance compensation value of the X block 2100 may be set to 0. Also, a chrominance compensation value of a block that does not undergo chrominance compensation may be set to 0 (median deriving method).

In another exemplary method of deriving a predicted chrominance compensation value from neighboring blocks (average deriving method), the A block 2110 and the B block 2120 are used as neighboring blocks. If all the A block 2110 and the B block 2120 have a chrominance compensation value, i.e., if the chrominance compensation values are not 0, an average of the chrominance compensation values of these blocks may be determined as the predicted value of the chrominance compensation value of the X block 2100.

If only one of the A block 2110 and the B block 2120 has a chrominance compensation value, the chrominance compensation value may be determined as the predicted value of the chrominance compensation value of the X block 2100.

If none of the A block 2110 and the B block 2120 have a chrominance compensation value, the predicted value of the chrominance compensation value is set to 0 (average deriving method).

Moreover, in another exemplary method of deriving a predicted chrominance compensation value from neighboring blocks, the A block 2110 and the B block 2120 are used as neighboring blocks and a flag indicating whether a chrominance compensation value exists is used. If both the A block 2110 and the B block 2120 have a chrominance compensation value, an average of these chrominance compensation values is determined as a predicted chrominance compensation value of the X block 2100. If the average is 0, the flag indicating whether a chrominance compensation value exists is set to 0 (average deriving method using flag).

Furthermore, in another exemplary method of deriving a predicted chrominance compensation value from neighboring blocks (priority deriving method), the A block 2110, the B block 2120, the C block 2130, and the D block 2140 are used as neighboring blocks. Priority is given in the order of the A block 2110, the B block 2120, the C block 2130, and the D block 2140. If a chrominance compensation value is determined for a predetermined neighboring block according to priority and the predetermined neighboring block has the same index as the X block 2100, the chrominance compensation value of the predetermined neighboring block is determined as the predicted chrominance compensation value of the X block 2100.

Otherwise, if the A block 2110, the B block 2120, and the C block 2130 have a chrominance compensation value, a median value of the chrominance compensation values of the A block 2110, the B block 2120, and the C block 2130 is determined as the predicted value of the chrominance compensation of the X block 2100.

If none of the A block 2110, the B block 2120, and the C block 2130 have a chrominance compensation value, the predicted value of the chrominance compensation of the X block 2100 is determined to be 0 (priority deriving method).

Also, in another exemplary method of deriving a predicted chrominance compensation value from neighboring blocks, the predicted value of the chrominance compensation of the X block 2100 may be derived from various combinations of values of the chrominance compensation of the A block 2110, the B block 2120, the C block 2130, and the D block 2140.

Figure 23:
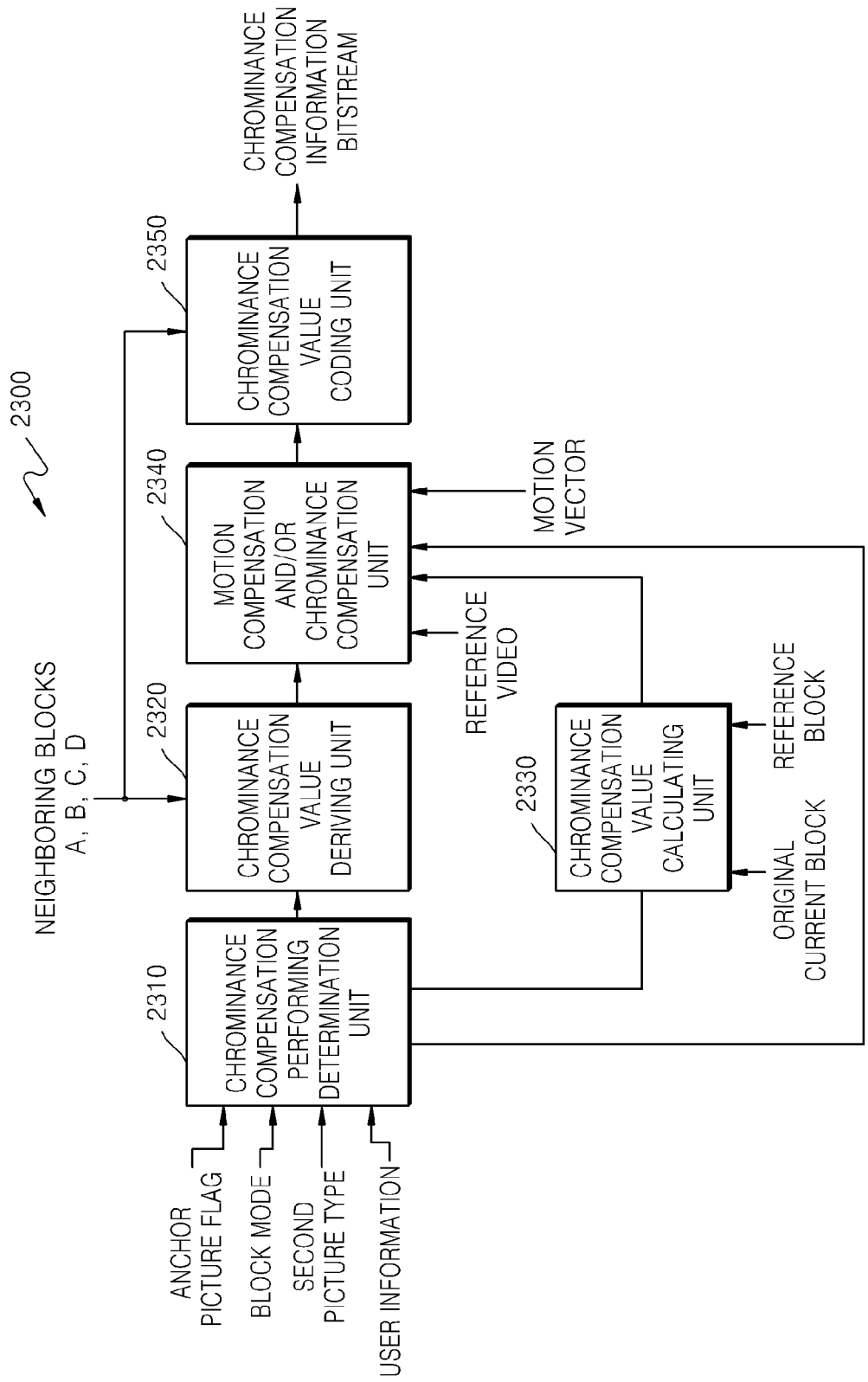
FIG. 23 is a block diagram of a multi-view video coding apparatus according to another exemplary embodiment.

FIG. 23 is a block diagram of a multi-view video coding apparatus 2300 according to another exemplary embodiment. Referring to FIG. 23, the multi-view video coding apparatus 2300 includes a chrominance compensation performing determination unit 2310, a chrominance compensation value derivation unit 2320, a chrominance compensation value calculation unit 2330, a motion compensation and/or chrominance compensation unit 2340, and a chrominance compensation value coding unit 2350.

The chrominance compensation performing determination unit 2310 receives an anchor picture flag indicating whether a current picture is an anchor picture, block mode information regarding a block that is to be currently coded (i.e., a current block), second picture type information of the current picture and other user information, and determines whether to perform chrominance compensation based on the received information.

As described above with reference to FIGS. 4A through 6B, if the chrominance compensation performing determination unit 2310 determines that the current picture is an anchor picture and the type of the current block is a predetermined block type, then the chrominance compensation value calculation unit 2330 operates. If it is determined that the current picture is not the anchor picture or the type of the current block is not the predetermined block type, the motion compensation and/or chrominance compensation unit 2340 operates.

As described above with reference to FIGS. 7A through 9B, if the chrominance compensation performing determination unit 2310 determines that the current picture is an anchor picture and is a predetermined block type of a predetermined picture type (e.g., a P picture type), then the chrominance compensation value calculation unit 2330 operates. If it is determined that the current picture is not the anchor picture or is not the predetermined block type of the predetermined picture type, the motion compensation and/or chrominance compensation unit 2340 operates.

As described above with reference to FIGS. 10A through 13B, if the chrominance compensation performing determination unit 2310 determines that the current picture is an anchor picture, a flag indicating whether to perform chrominance compensation is set to 1, and the type of the current block is a predetermined block type, then the chrominance compensation value calculation unit 2330 operates. If it is determined that the current picture is not the anchor picture, the flag indicating whether to perform chrominance compensation is not set to 1, or the type of the current block is not the predetermined block type, the motion compensation and/or chrominance compensation unit 2340 operates.

As described above with reference to FIGS. 14 through 16B, if the chrominance compensation performing determination unit 2310 determines that the current picture is an anchor picture and the type of the current block is a skip mode block, then the chrominance compensation value derivation unit 2320 operates. If it is determined that the type of the current block is a predetermined block type rather than the skip mode block, the chrominance compensation value calculation unit 2330 operates. If it is determined that the type of the current block is neither the skip mode block nor the predetermined block type, the motion compensation and/or chrominance compensation unit 2340 operates.

The chrominance compensation value derivation unit 2320 receives information regarding neighboring blocks of the current block, determines a chrominance compensation value of the current block according to, for example, one of the exemplary methods of deriving a chrominance compensation value, which is described above with reference to FIGS. 21 and 22, and then outputs the chrominance compensation value to the motion compensation and/or chrominance compensation unit 2340.

The chrominance compensation value calculation unit 2330 receives the original current block and a reference block, determines a chrominance compensation value of the current block, and outputs the chrominance compensation value to the motion compensation and/or chrominance compensation unit 2340. The chrominance compensation value is determined according to, for example, the exemplary method of determining a chrominance compensation value, which is described above with reference to FIG. 17.

The motion compensation and/or chrominance compensation unit 2340 receives the chrominance compensation value, a reference video, and a motion vector from the chrominance compensation value derivation unit 2320 or the chrominance compensation value calculation unit 2330 and then performs chrominance compensation and motion compensation. Chrominance compensation and motion compensation may be performed simultaneously or separately. The motion compensation and/or chrominance compensation unit 2340 may perform chrominance compensation as described above with reference to FIG. 18.

The chrominance compensation value coding unit 2350 may code either the chrominance compensation value received from the motion compensation and/or chrominance compensation unit 2340 or chrominance information of the neighboring blocks, and inserts the coding result into a bitstream. The chrominance information including chrominance compensation values may be coded as described above with reference to FIGS. 19 and 20.

Figure 24:
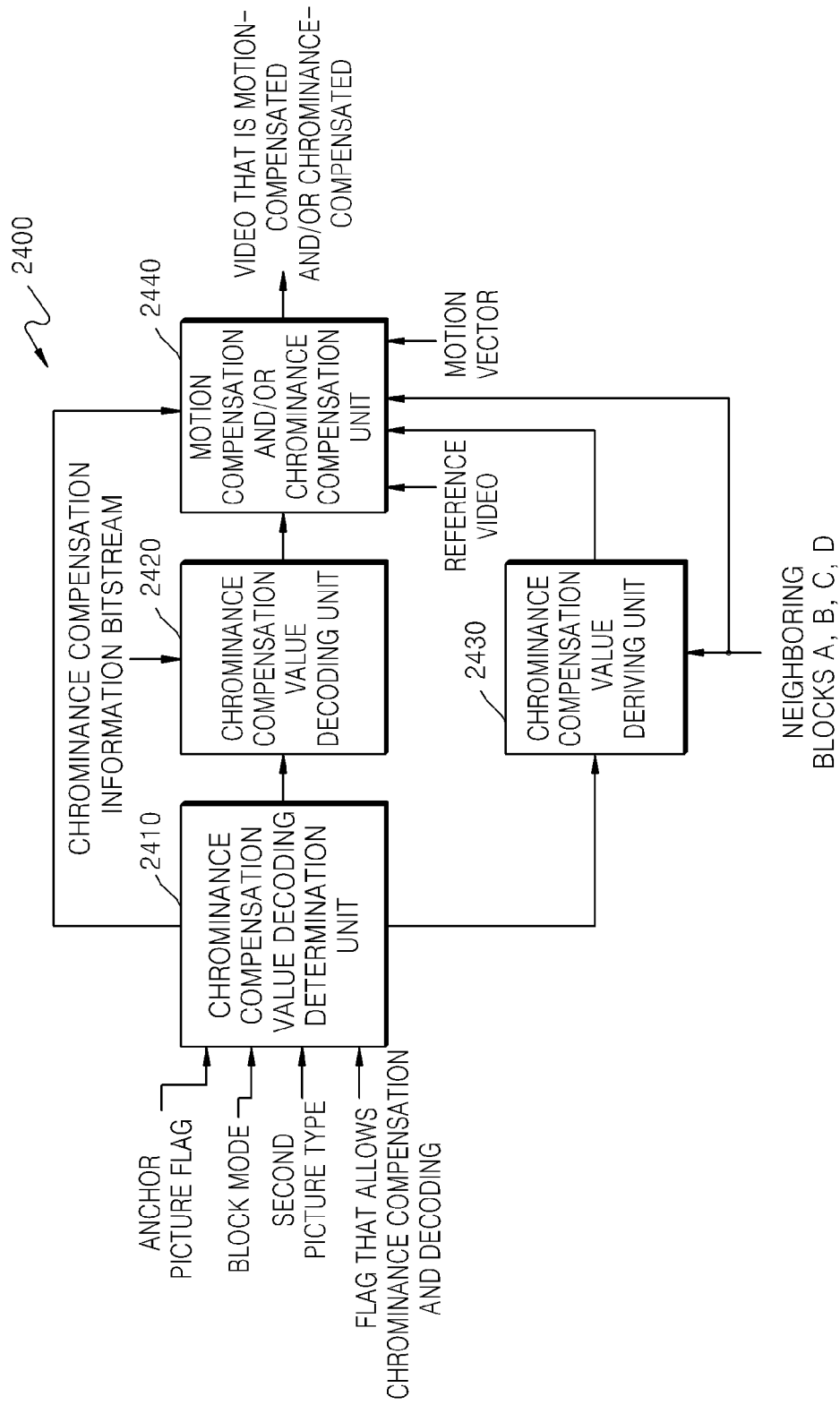
FIG. 24 is a block diagram of a multi-view video decoding apparatus according to another exemplary embodiment.

FIG. 24 is a block diagram of a multi-view video decoding apparatus 2400 according to another exemplary embodiment. Referring to FIG. 24, the multi-view video decoding apparatus 2400 includes a chrominance compensation value decoding determination unit 2410, a chrominance compensation value decoding unit 2420, a chrominance compensation value derivation unit 2430, and a motion compensation and/or chrominance compensation unit 2440.

The chrominance compensation value decoding determination unit 2410 receives an anchor picture flag of a current picture that is to be decoded, block mode information of a current block that is to be decoded, second picture type information of the current picture, and flags respectively indicating whether to perform chrominance compensation or whether to perform decoding, and then determines whether to perform chrominance compensation based on the received information.

As described above with reference to FIGS. 4A through 6B, if the chrominance compensation value decoding determination unit 2410 determines that the current picture is an anchor picture and the type of the current block is a predetermined block type, then the chrominance compensation value decoding unit 2420 operates. If it is determined that the current picture is not the anchor picture or the type of the current block is not the predetermined block type, the motion compensation and/or chrominance compensation unit 2440 operates.

As described above with reference to FIGS. 7A through 9B, if the chrominance compensation value decoding determination unit 2410 determines that the current picture is an anchor picture and is a predetermined block type of a predetermined picture type (e.g., a P picture type), then the chrominance compensation value decoding unit 2420 operates. If it is determined that the current picture is not the anchor picture or is not the predetermined block type of the predetermined picture type, the motion compensation and/or chrominance compensation unit 2440 operates.

As described above with reference to FIGS. 10A through 13B, if the chrominance compensation value decoding determination unit 2410 determines that the current picture is an anchor picture, a flag indicating whether to perform chrominance compensation is set to 1, and the type of the current block is a predetermined block type, then the chrominance compensation value decoding unit 2420 operates. If it is determined that the current picture is not the anchor picture, the flag is not set to 1, or the type of the current block is not the predetermined block type, the motion compensation and/or chrominance compensation unit 2440 operates.

As described above with reference to FIGS. 14 through 16B, if the chrominance compensation value decoding determination unit 2410 determines that the current picture is an anchor picture and the type of the current block is a skip mode block, then the chrominance compensation value decoding unit 2420 operates. If the type of the current block type is a predetermined block type rather than the skip mode block, the chrominance compensation value derivation unit 2430 operates. If the type of the current block type is neither the predetermined block type nor the skip mode block, the motion compensation and/or chrominance compensation unit 2440 operates.

The chrominance compensation value decoding unit 2420 receives a bitstream including chrominance compensation information and decodes a chrominance compensation value. According to one or more exemplary embodiments, the chrominance compensation value may be decoded as described above with reference to FIGS. 19 and 20. The chrominance compensation value decoding unit 2420 determines a chrominance compensation value of the current block and outputs the determined chrominance compensation value to the motion compensation and/or chrominance compensation unit 2440.

The chrominance compensation value derivation unit 2430 receives information regarding neighboring blocks of the current block, determines a chrominance compensation value of the current block according to, for example, one of the exemplary methods of deriving a chrominance compensation value, which is described above with reference to FIGS. 21 and 22, and then outputs the chrominance compensation value to the motion compensation and/or chrominance compensation unit 2440.

The motion compensation and/or chrominance compensation unit 2440 receives the chrominance compensation value, a reference video, and a motion vector from the chrominance compensation value decoding unit 2320 or the chrominance compensation value derivation unit 2430, and performs chrominance compensation and motion compensation. The chrominance compensation and motion compensation may be performed simultaneously or separately. Furthermore, the motion compensation and/or chrominance compensation unit 2440 may perform chrominance compensation as described above with reference to FIG. 18, and may output a resultant picture that undergoes motion compensation and/or chrominance compensation.

Figure 25:
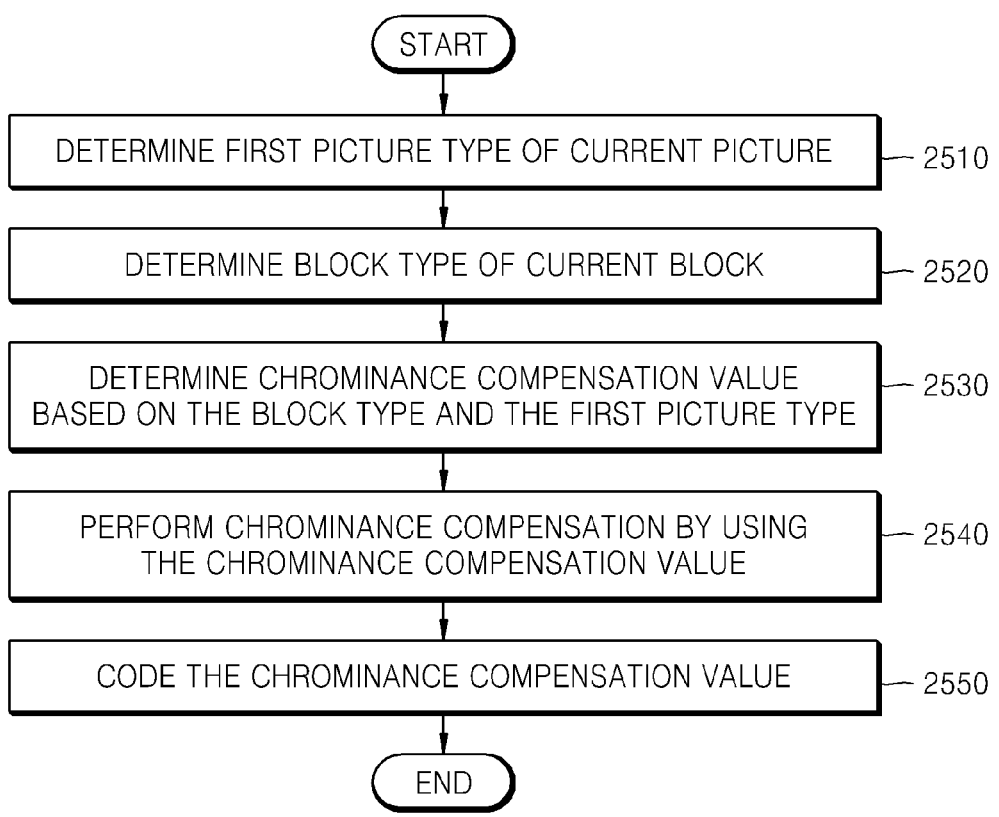
FIG. 25 is a flowchart illustrating a multi-view video coding method according to an exemplary embodiment.

FIG. 25 is a flowchart illustrating a multi-view video coding method according to an exemplary embodiment. Referring to FIG. 25, in operation 2510, a first picture type indicating whether a current picture is a reference video type for inter prediction is determined. For example, with the first picture type, it is possible to classify the current picture into an anchor picture type and a non-anchor picture type. An anchor picture is predicted by referring to pictures from different viewpoints along a same time axis and is referred to when predicting other pictures from a same viewpoint.

In operation 2520, a block type indicating a method of determining a motion vector of a current block present in the current picture is determined. The block type is classified according to a method of determining a motion vector. For example, a predetermined block type is a set including at least one of a skip mode block, an inter mode block, and a direct mode block. In operation 2520, whether the current block is the predetermined block type is determined.

In operation 2530, a chrominance compensation value of the current block is determined based on at least one of the block type and the first picture type. The chrominance compensation value may be determined based on at least one of whether the current block is the predetermined block type, whether the current picture is an anchor picture or a P picture and whether a flag indicating whether to perform chrominance compensation is set. The chrominance compensation value may be directly obtained by performing chrominance compensation on the current block or may be derived from chrominance compensation values of neighboring blocks.

In operation 2540, chrominance compensation is performed on the current block by using a chrominance compensation value. Chrominance compensation may be performed by replacing a chrominance pixel value of the current block with a sum of the chrominance compensation value and a chrominance pixel value of a reference block.

In operation 2550, the chrominance compensation value is coded, the coding result is inserted into a bitstream, and the bitstream is transmitted. The chrominance compensation value may be directly coded or may be coded by coding a difference between the chrominance compensation value of the current block and a predicted chrominance compensation value, which is predicted from the neighboring blocks, thereby increasing coding efficiency. Also, flags set in relation to chrominance compensation may be inserted into the same bitstream or may be separately inserted into different bitstreams.

Figure 26:
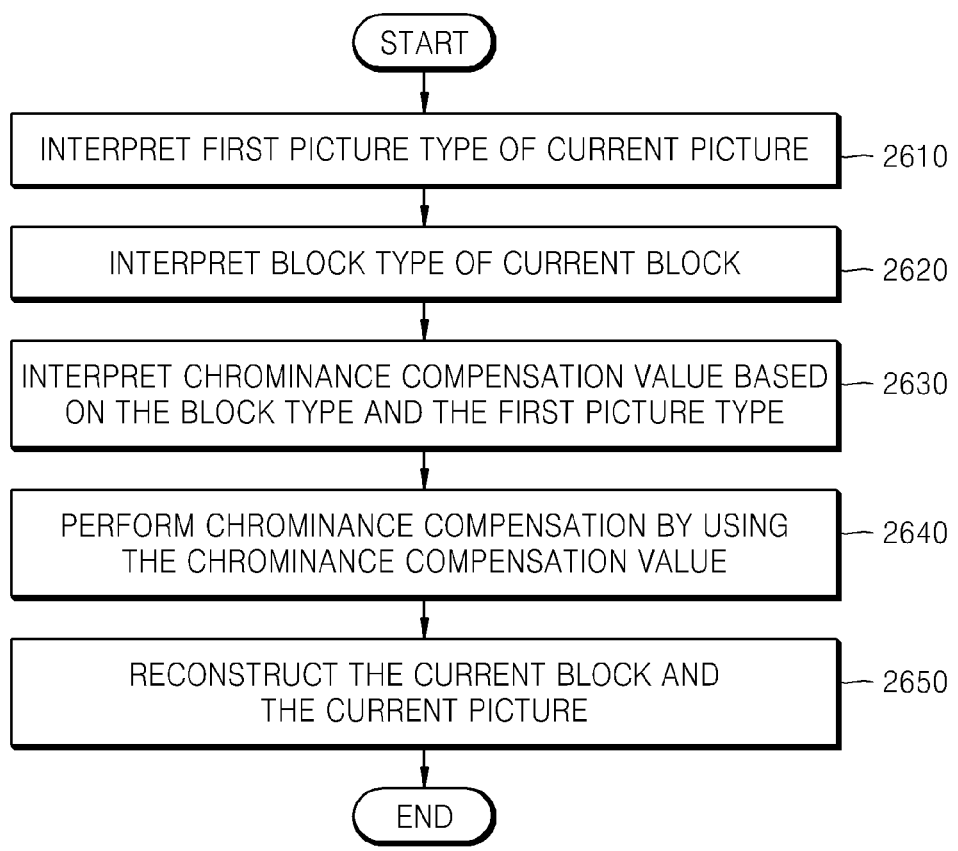
FIG. 26 is a flowchart illustrating a multi-view video decoding method according to an exemplary embodiment.

FIG. 26 is a flowchart illustrating a multi-view video decoding method according to an exemplary embodiment. Referring to FIG. 26, in operation 2610, a first picture type indicating whether a current picture is a reference video type for inter prediction is interpreted. For example, whether the current picture is an anchor picture may be determined by interpreting syntax included in a bitstream, which indicates the first picture type of the current picture.

In operation 2620, a block type indicating a method of determining a motion vector of a current block present in the current picture is interpreted. For example, syntax included in the bitstream, which indicates the block type of the current block, may be interpreted to determine whether the current block is in a skip mode, an inter mode, or a direct mode.

In operation 2630, a chrominance compensation value of the current block is interpreted based on at least one of the first picture type and the block type. The chrominance compensation value may be determined based on at least one of whether the current block is a predetermined block type, whether the current picture is an anchor picture or a P picture, and whether a flag indicating whether to perform chrominance compensation is set. The chrominance compensation value may be directly obtained by performing chrominance compensation on the current block or may be derived from chrominance compensation values of neighboring blocks.

In operation 2640, chrominance compensation is performed on the current block by using the chrominance compensation value. Chrominance compensation may be performed by replacing a chrominance pixel value of the current block with a sum of the chrominance compensation value and a chrominance pixel value of a reference block.

In operation 2650, the current block that undergoes the chrominance compensation is reconstructed and the current picture is reconstructed.

While not restricted thereto, one or more of the aforementioned exemplary embodiments may be embodied as a computer program that can be run by a general digital computer via a computer-readable recording medium. The computer-readable recording medium may be a magnetic recording medium (a ROM, a floppy disk, a hard disc, etc.), an optical recording medium (a CD-ROM, a DVD, etc.), etc. Furthermore, one or more of the exemplary embodiments may be embodied as a carrier wave medium that transmits data via the Internet.

While aspects have been particularly shown and described with reference to exemplary embodiments thereof, it will be understood by those of ordinary skill in the art that various changes in form and details may be made therein without departing from the spirit and scope of the inventive concept as defined by the appended claims.

The invention claimed is:

1. A method of decoding multi-view video, the method comprising:
   interpreting a first picture type indicating whether a current picture of the multi-view video is a reference picture type for inter prediction of other pictures from a same or different view point as the current picture; and
   in response to the interpreted first picture type being the reference picture type:
   interpreting a block type mode indicating a method of determining a motion vector of a current block of the current picture;
   interpreting, using a processor, a chrominance compensation value of the current block based on at least one of the interpreted first picture type and the interpreted block type mode; and
   performing chrominance compensation on the current block by using the interpreted chrominance compensation value,
   wherein interpreting the chrominance compensation value comprises:
   determining whether to perform the chrominance compensation on the current block based on the interpreted first picture type; and
   interpreting, when the first picture type includes the reference picture type, the chrominance compensation value of the current block.

2. The method of claim 1, further comprising, after the performing of the chrominance compensation, reconstructing the current block and the current picture.

3. The method of claim 1, wherein:
   the interpreting of the chrominance compensation value further comprises determining whether to perform the chrominance compensation on the current block based on the interpreted first picture type and the interpreted block type mode; and
   the block type mode indicates whether the current block is a skip mode block type.

4. The method of claim 1, further comprising:
   interpreting a second picture type of the current picture,
   wherein the interpreting of the chrominance compensation value comprises determining whether to perform the chrominance compensation on the current block based on the interpreted first picture type, the interpreted block type mode, and the interpreted second picture type, and the second picture type comprises at least one of an intra-coded (I) picture type, a predictive-coded (P) picture type, and a bi-directional (B) picture type.

5. The method of claim 3, further comprising interpreting a flag indicating whether to perform the chrominance compensation on the current block,
   wherein the interpreting of the chrominance compensation value further comprises determining whether to perform the chrominance compensation on the current block based on the interpreted first picture type, the interpreted flag, and the interpreted block type mode.

6. The method of claim 3, wherein the interpreting of the chrominance compensation value further comprises:
   if the block type mode of the current block is the skip mode block type, deriving the chrominance compensation value of the current block from at least one of chrominance compensation values of neighboring blocks of the current block; and
   if the block type mode of the current block is not the skip block type, determining the chrominance compensation value of the current block by performing the chrominance compensation on the current block.

7. The method of claim 1, wherein the interpreting of the chrominance compensation value comprises:
   interpreting a chrominance compensation difference value related to the current block;
   interpreting a predicted chrominance compensation value of the current block by using at least one of chrominance compensation values of neighboring blocks of the current block; and
   determining the chrominance compensation value of the current block by combining the predicted chrominance compensation value and the chrominance compensation difference value.

8. The method of claim 7, wherein:
   the interpreting of the chrominance compensation value further comprises interpreting a flag indicating whether to use the chrominance compensation difference value with respect to the chrominance compensation value; and
   the performing of the chrominance compensation comprises performing the chrominance compensation on the current block by using the chrominance compensation difference value of the current block, based on the interpreted flag indicating whether to use the chrominance compensation difference value.

9. The method of claim 6, wherein the deriving of the chrominance compensation value comprises:
   comparing an absolute value of a difference between pixel values of a first block and a third block with an absolute value of a difference between pixel values of a second block and the third block, wherein the first block is located at a first side of the current block, the second block is located at a second side, different from the first side, of the current block, and the third block is located at a third side, different from the first and second sides, of the current block; and
   determining a chrominance compensation value of the first block or the second block as a predicted chrominance compensation value of the current block, based on the comparing result.

10. The method of claim 6, wherein the deriving of the chrominance compensation value comprises determining a median value of chrominance compensation values of a first block, a second block, and a third block as a predicted chrominance compensation value of the current block, where the first block is located at a first side of the current block, the second block is located at a second side, different from the first side, of the current block, and the third block is located at a third side, different from the first and second sides, of the current block.

11. The method of claim 6, wherein the deriving of the chrominance compensation value comprises determining an average of chrominance compensation values of a first block and a second block as a predicted chrominance compensation value of the current block, where the first block is located at a left side of the current block and the second block is located above the current block.

12. The method of claim 6, wherein the deriving of the chrominance compensation value comprises:
   determining priority in an order of first through fourth blocks which are neighboring blocks of the current block, where the first block is located at a left side of the current block, the second block is located above the current block, the third block is located at an upper right side of the current block, and the fourth block is located at an upper left side of the current block;
   determining a chrominance compensation value of a block having a same reference index as the current block, as a predicted chrominance compensation value of the current block, from among the first through fourth blocks;
   if none of the first through fourth blocks have the same reference index as the current block, determining a median value of chrominance compensation values of the first through fourth blocks as the predicted chrominance compensation value of the current block; and
   if the first through fourth blocks do not have a chrominance compensation value, determining the predicted chrominance compensation value of the current block to be 0.

13. The method of claim 5, wherein the interpreting of the chrominance compensation value comprises determining the chrominance compensation value to be 0 if the flag indicating whether to perform the chrominance compensation is 0.

14. The method of claim 5, wherein:
   the flag indicating whether to perform the chrominance compensation is set based on a combination of absolute values of differences between averages of pixel values of the current picture and a reference video of the current picture, and
   each of the absolute values is an absolute value of a difference between an average of pixel values of the current picture and an average of pixel values of the reference video, for each of Y, U, and V components.

15. The method of claim 14, wherein the combination of the absolute values comprises a sum of the absolute values of the differences between the averages of the pixel values of the Y, U, and V components.

16. The method of claim 14, wherein the combination of the absolute values comprises values obtained by combining squares of the absolute values of the differences between the averages of the pixel values of the Y, U, and V color components and calculating square roots of the combining results.

17. The method of claim 14, wherein the combination of the absolute values comprises an average of squares of the absolute values of the differences between the averages of the pixel values of a Y, U and V components.

18. The method of claim 5, wherein the flag indicating whether to perform the chrominance compensation is set based on a result of respectively comparing an absolute value of differences between an average of pixel values of the current picture and an average of pixel values of a reference video of the current picture, for each of U and V color components, with predetermined thresholds of the U and V components.

19. The method of claim 5, wherein the flag indicating whether to perform the chrominance compensation is set based on a quantization parameter of the current picture.

20. The method of claim 5, wherein the flag indicating whether to perform the chrominance compensation is set based on a user input.

21. The method of claim 1, wherein in the interpreting of the chrominance compensation value, the chrominance compensation value comprises a value obtained by averaging differences between all pixel values of the current block and a reference block of the current block, for each of U and V components.

22. The method of claim 1, wherein in the interpreting of the chrominance compensation value, if the current block has two or more reference blocks, the chrominance compensation value comprises a value obtained by averaging differences between all pixel values of the current block and each of the reference blocks, for each of U and V components.

23. The method of claim 1, wherein in the interpreting of the chrominance compensation value, if the current block has two or more reference blocks, the chrominance compensation value comprises a value obtained by averaging differences between all pixel values of the current block and a representative reference block, which is generated from the two or more reference blocks, for each of U and V components.

24. The method of claim 23, wherein the representative reference block is generated by interpolating the two or more reference blocks.

25. The method of claim 1, wherein the performing of the chrominance compensation comprises combining the chrominance compensation value of the current block with pixel values of a reference block of the current block, for each of U and V components.

26. The method of claim 1, wherein, if the current block has two or more reference blocks, the performing of the chrominance compensation comprises combining the chrominance compensation value of the current block with pixel values of each of the two or more reference blocks, for each of U and V components.

27. The method of claim 1, wherein, if the current block has two or more reference blocks, the performing of the chrominance compensation comprises combining the chrominance compensation value of the current block with pixel values of a representative reference block, which is generated from the two or more reference blocks, for each of U and V components.

28. The method of claim 1, wherein the determining of whether to perform the chrominance compensation comprises determining not to perform the chrominance compensation when the current picture is not the reference picture.

29. The method of claim 1, wherein:
   the interpreting of the chrominance compensation value further comprises determining whether to perform the chrominance compensation on the current block based on the interpreted first picture type and the interpreted block type mode; and
   the determining of whether to perform the chrominance compensation comprises determining not to perform the chrominance compensation when the block type mode is not a predetermined block type mode or the current picture is not a reference picture for inter predicting other pictures from a same viewpoint as the current picture and for inter-view predicting other pictures from a different viewpoint as the current picture.

30. The method of claim 4, wherein the determining of whether to perform the chrominance compensation comprises determining not to perform the chrominance compensation when the current picture is not the reference picture, the block type mode is not a predetermined block type mode, or the second picture type is not the P picture type.

31. The method of claim 9, wherein the first side is a left side of the current block, the second side is above the current block, and the third side is an upper left side of the current block.

32. A method of coding multi-view video, the method comprising:
   determining a first picture type indicating whether a current picture of the multi-view video is a reference video type for inter prediction of other pictures from a same or different viewpoint as the current picture; and
   in response to determining that the current picture is a reference video type:
   determining a block type mode indicating a method of determining a motion vector of a current block of the current picture;
   determining a chrominance compensation value of the current block based on at least one of the determined first picture type and the determined block type mode; and
   performing chrominance compensation on the current block by using the determined chrominance compensation value,
   wherein determining the chrominance compensation value comprises:
   determining whether to perform the chrominance compensation on the current block based on the determined first picture type; and
   determining, when the first picture type includes the reference picture type, the chrominance compensation value of the current block.

33. An apparatus for decoding multi-view video, the apparatus comprising:
   a first picture type interpretation unit, as executed by a processor, the first picture interpretation unit interpreting a first picture type indicating whether a current picture of the multi-view video is a reference video type for inter prediction of other pictures from a same or different view point as the current picture; and
   a block type interpretation unit which, in response to the current picture being a reference video type, interprets a block type mode indicating a method of determining a motion vector of a current block of the current picture;
   a chrominance compensation value interpretation unit which, in response to the current picture being a reference video type, interprets a chrominance compensation value of the current block based on at least one of the interpreted first picture type and the interpreted block type mode; and
   a chrominance compensation performing unit which, in response to the current picture being a reference video type, performs chrominance compensation on the current block by using the interpreted chrominance compensation value,
   wherein when the first picture type includes the reference picture type, the chrominance compensation value interpretation unit interprets the chrominance compensation value of the current block.

34. An apparatus for coding multi-view video, the apparatus comprising:
   a first picture type determination unit, as executed by a processor, the first picture interpretation unit interpreting a first picture type indicating whether a current picture of the multi-view video is a reference video type for inter prediction of other pictures from a same or different view point as the current picture; and
   a block type determination unit which, in response to the current picture being a reference video type, determines a block type mode indicating a method of determining a motion vector of a current block of the current picture;
   a chrominance compensation value determination unit which, in response to the current picture being a reference video type, determines a chrominance compensation value of the current block based on at least one of the determined first picture type and the determined block type mode; and
   a chrominance compensation performing unit which, in response to the current picture being a reference video type, performs chrominance compensation on the current block by using the determined chrominance compensation value,
   wherein when the first picture type includes the reference picture type, the chrominance compensation value determination unit determines the chrominance compensation value of the current block.

35. A non-transitory computer readable recording medium having recorded thereon a computer program for executing a method of coding multi-view video, the method comprising:
   determining a first picture type indicating whether a current picture of the multi-view video is a reference video type for inter prediction; and
   in response to the determined first picture type being the reference picture type:
   determining a block type mode indicating a method of determining a motion vector of a current block of the current picture;
   determining a chrominance compensation value of the current block based on at least one of the determined first picture type and the determined block type mode; and
   performing chrominance compensation on the current block by using the determined chrominance compensation value,
   wherein the determining the chrominance compensation value comprises:
   determining whether to perform the chrominance compensation on the current block based on the determined first picture type; and
   determining, when the first picture type includes the reference picture type, the chrominance compensation value of the current block.

36. A non-transitory computer readable recoding medium having recorded thereon a computer program for executing a method of decoding multi-view video, the method comprising:
   interpreting a first picture type indicating whether a current picture of the multi-view video is a reference video type for inter prediction; and
   in response to the interpreted first picture type being the reference picture type:
   interpreting a block type mode indicating a method of determining a motion vector of a current block of the current picture;
   interpreting a chrominance compensation value of the current block based on at least one of the interpreted first picture type and the interpreted block type mode; and
   performing chrominance compensation on the current block by using the interpreted chrominance compensation value,
   wherein the interpreting the chrominance compensation value comprises:
   determining whether to perform the chrominance compensation on the current block based on the interpreted first picture type; and interpreting, when the first picture type includes the reference picture type, the chrominance compensation value of the current block.

37. A method of decoding multi-view video, the method comprising:
   interpreting a first picture type indicating whether a current picture of the multi-view video is a reference picture type for inter prediction of other pictures from a same or different view point as the current picture; and
   in response to the interpreted first picture type being the reference picture type:
   interpreting a chrominance compensation value of the current block based on the interpreted first picture type; and
   performing chrominance compensation on the current block by using the interpreted chrominance compensation value,
   wherein the interpreting the chrominance compensation value comprises:
   determining whether to perform the chrominance compensation on the current block based on the interpreted first picture type; and
   interpreting, when the first picture type includes the reference picture type, the chrominance compensation value of the current block.

38. A non-transitory computer-readable recording medium having recorded thereon a program executable for performing the method of claim 37.

* * * * *